United States Patent
Abeykoon et al.

(10) Patent No.: US 9,760,970 B2
(45) Date of Patent: Sep. 12, 2017

(54) VIDEO ANALYSIS AND POST PROCESSING OF MULTIPLE VIDEO STREAMS

(71) Applicant: HITACHI, LTD., Tokyo (JP)

(72) Inventors: Abeykoon Mudiyanselage Hunfuko Asanka Abeykoon, Singapore (SG); Hirokazu Ikeda, Singapore (SG)

(73) Assignee: Hitachi, Ltd., Tokyo (JP)

( * ) Notice: Subject to any disclaimer, the term of this patent is extended or adjusted under 35 U.S.C. 154(b) by 99 days.

(21) Appl. No.: 14/661,173

(22) Filed: Mar. 18, 2015

(65) Prior Publication Data
US 2016/0275642 A1 Sep. 22, 2016

(51) Int. Cl.
*G06T 1/20* (2006.01)
*G06K 9/00* (2006.01)

(52) U.S. Cl.
CPC ............ *G06T 1/20* (2013.01); *G06K 9/00711* (2013.01); *G06K 9/00973* (2013.01)

(58) Field of Classification Search
CPC ... G06T 1/20; G06K 9/00973; G06K 9/00711
USPC ....................................................... 382/209
See application file for complete search history.

(56) References Cited

U.S. PATENT DOCUMENTS

| | | | |
|---|---|---|---|
| 2005/0232462 A1 | 10/2005 | Vallone et al. | |
| 2008/0117217 A1* | 5/2008 | Bakalash .............. | G06F 9/5066 345/502 |
| 2009/0087037 A1* | 4/2009 | Wada ................ | G06F 17/30793 382/118 |

FOREIGN PATENT DOCUMENTS

EP 2378464 A2 10/2011

* cited by examiner

*Primary Examiner* — Amandeep Saini
(74) *Attorney, Agent, or Firm* — Mattingly & Malur, PC

(57) ABSTRACT

In some examples, a video analysis framework receives one or more video streams including a plurality of video frames. The framework may perform region detection on the frames, and may perform feature detection/extraction on the regions. Based on the extracted features, the individual video frames may be sent to particular pipelines of a plurality of pipelines designated for performing different video analysis tasks. The framework may determine respective indexed profiles to associate with particular detected regions for indexing the individual video frames or regions thereof. In some cases, resources may be allocated among the pipelines based on a priority definition. For instance, the priorities in the priority definition may be updated dynamically based on context of the received frames. Further, a log of recent video analysis results may be maintained to enable indexing, annotation, augmentation, and searching for related content without having to access information in a storage system.

19 Claims, 14 Drawing Sheets

VIDEO ANALYSIS AND POST PROCESSING OF MULTIPLE VIDEO STREAMS

BACKGROUND

With the rapid growth of video content in recent years, there has been an increased demand for video-related applications in various industries, such as broadcasting, content generation, surveillance, and so forth. In some cases, these video-related applications rely on video analysis techniques that may include indexing, annotation and/or searching performed in relation to video streams and its context. Further, real time or near real time video analysis can be useful for enabling advanced applications, such as accelerated processing of large video archives, rapid provision of video content in the broadcasting industry, or the like. However, real time video analysis for typical indexing tasks, e.g., object detection, object recognition, object tracking, scene detection, action detection, pose estimation, etc., can be challenging, such as in the case of high video frame rates and/or high resolution video, which can increase the load on available computational resources. For example, conventional solutions for real time video analysis are not highly dynamic and are typically aimed at specific tasks. In addition, conventional solutions may not be extensible and may not be able to adapt dynamically during real time video analysis.

SUMMARY

Some implementations include pipeline-based video analysis able to perform real time indexing, annotation and/or searching in relation to multiple video streams. For instance, to meet real time video analysis demands, the indexing, annotation and related searching operations may be managed based on one or more priorities determined for particular video analysis tasks. In some examples, decisions as to whether to proceed with particular indexing tasks, annotation tasks, or the like, may be determined based on the priorities and/or other factors, such as in environments having limited computational resources. Further, in some cases, a plurality of pipelines may be provided, with individual pipelines being dedicated to different detection, recognition, or other video analysis tasks. Further, skipping of any tasks may be performed based on aforementioned priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
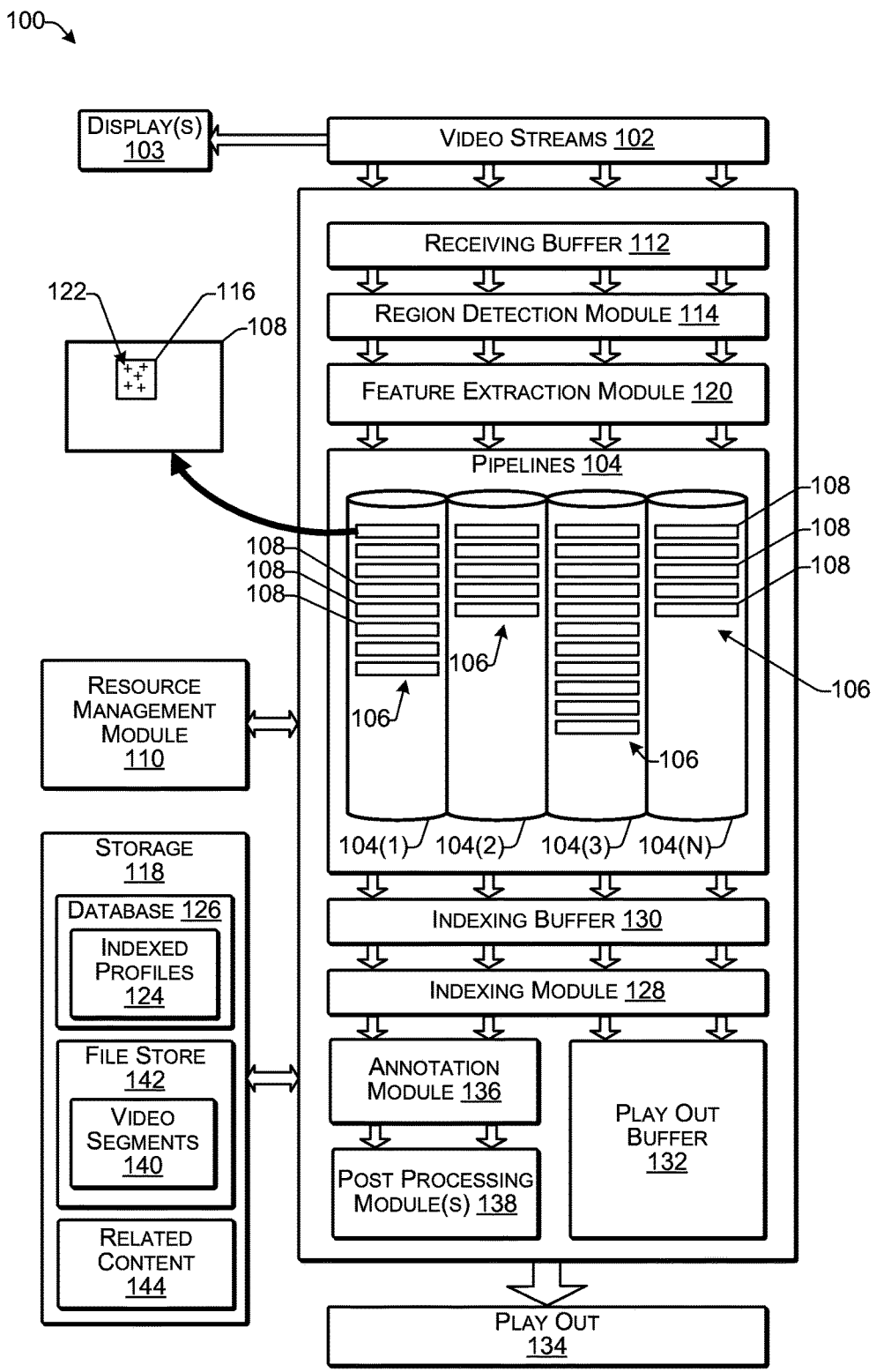
FIG. 1 illustrates an example framework for parallel pipeline processing of multiple video streams according to some implementations.

Some examples herein are directed to techniques and arrangements for parallel pipeline processing of one or more video streams. For instance, a video analysis framework herein is able to handle video indexing, annotation, post processing, and/or related content searching demands in real time or near real time. In some cases, the video analysis framework may manage real time demands based on a determined contextual priority associated with the video streams. Thus, implementations herein may perform video analysis and indexing on multiple video streams based at least in part on detected contexts of portions of the video streams, rather than merely processing multiple video streams individually in parallel. Moreover, implementations may allocate computational resources based on priorities for various contexts that may be assigned dynamically based on detected frequencies of the visual categories and/or contexts, or through various other techniques as discussed additionally below.

Further, some examples may employ a log data structure to determine the context of recently received video streams. The log data structure may also be used to improve performance in indexing, annotation and post processing tasks. Additionally, the video analysis framework may have the flexibility to be applied in various different types of video analysis tasks and applications. In some instances, the video analysis framework can be used to index and annotate real time video streams for enabling advanced applications, including real time video segment generation, augmentation, censorship, and provision of related content.

As one example, the video analysis framework may receive a plurality of video streams, each including a plurality of video frames. The video analysis framework may perform region detection on the video frames, and may perform feature detection/extraction or multiple feature detection/extraction on the detected regions. Based on a detected region and/or detected features, the individual video frames may be sent to particular pipelines of a plurality of pipelines. Individual pipelines may be dedicated to performing different video analysis tasks in parallel. In some examples, the pipelines may determine respective indexed profiles to associate with particular detected regions for indexing the individual video frames and/or the detected regions. In some cases, resources may be reassigned among the pipelines based on a priority definition. For instance, the priorities in the priority definition may be updated dynamically based on the received video frames. Further, the video analysis framework may maintain a log of recent video frame processing results to enable indexing, annotation, augmentation, and searching for related content with minimal access to information in a storage system or other storage locations.

For discussion purposes, some example implementations are described in the environment of a computing device performing video analysis. However, implementations herein are not limited to the particular examples provided, and may be extended to other types of devices, other execution environments, other system architectures, and so forth, as will be apparent to those of skill in the art in light of the disclosure herein.

FIG. 1 illustrates an example video analysis framework 100 able to process multiple video streams according to some implementations. For instance, the framework 100 may receive a plurality of video streams 102 for processing, such as for indexing, annotating, post processing, searching for related material, or the like. In some implementations, the received video streams 102 may be presented on one or more displays 103, such as before, during, and/or after the video analysis described herein. For instance, a single display 103 may present a single video stream 102, or may be used to present multiple video streams 102 concurrently. Alternatively, multiple displays 103 may be used to present multiple video streams 102 concurrently. In some examples, the video streams 102 may be processed in real time through a plurality of pipelines 104. For instance, pipeline processing may use parallel pipelines 104 to process input frames assigned for different processing tasks by performing the different processing tasks at least partially concurrently with each other. Thus, different pipelines 104 may be designated for different video analysis tasks, and each pipeline 104 may include one or more stages for performing a particular video analysis task or portion of a particular video analysis task. For instance, a pipeline 104 may be used to perform various computations on a plurality of features extracted from each video frame. Each pipeline 104 may include one or more pipeline queues 106 that may act as buffers that receive video frames 108, detected regions, and/or features extracted from the video frames 108 of various video streams. The pipelines 104 may generally be used to perform multistage processing of the extracted features for a plurality of different video analysis tasks, as discussed above, and may be able to be executed concurrently in parallel with other pipelines 104 executing other video analysis tasks, such as those pertaining to different visual categories.

In some examples, each pipeline 104 may be composed of a series of producer/consumer stages, each dependent on the output of a predecessor for perform a particular overall video analysis task of the respective pipeline 104. Examples of video analysis tasks that may be performed by the pipelines 104 herein include: general detection, identification or other recognition tasks: such as for faces, objects, locations, scenes, actions, logos, emotions, genders, costumes, furniture, and so on; context or genre recognition and identification (e.g., wild life, drama, news, etc.); optical character recognition; on-screen character recognition; gesture recognition; texture recognition, classification, and other texture-related operations; feature tracking; pose estimation and/or tracking, including position and orientation estimation of, e.g., a texture, a marker, a person, an object, a logo, a place, a location, and so forth; object tracking; motion estimation; motion tracking; motion segmentation; motion compensation; disparity computation; stereo rectification; image segmentation; and image registration. Further, while several examples of video analysis tasks are described herein, other types of video analysis tasks that may be used with the pipelines herein will be apparent to those of skill in the art having the benefit of the disclosure herein.

In some examples, individual ones of the video analysis tasks mentioned above may each be executed by a separate respective multistage pipeline processing technique, as discussed additionally below, and may correspond to a separate visual category, concept, or context. In other examples, a group or subset of the video analysis tasks mentioned above may be executed using a single pipeline, and may correspond to a single visual category or multiple visual categories. Accordingly, the visual categories herein, and the configuration of the pipelines used, may vary based on the intended use of the system and the desired results to be achieved.

A resource management module 110 may control or otherwise manage the framework 100, or portions thereof, to enable real time processing of various different categories of video analysis tasks, such as human face detection, recognition, and/or identification; object detection, recognition, and/or identification; scene detection and/or recognition; scene change detection and/or recognition; motion computation, estimation, segmentation, tracking, and/or recognition; and so forth. Furthermore, the resource management module 110 may monitor and manage system resources, such as processing resources, memory resources, storage resources, communication resources, and the like, of one or more computing devices to enable the plurality of video streams 102 to be processed efficiently by the plurality of pipelines 104. As mentioned above, in some examples, the plurality of video streams may be processed in real time or near real time, such that the processing takes place during a short period of time after the video frames are received. In other examples, the processing may take place over a longer duration and/or may not be performed in real time.

The plurality of video streams 102 may be received from any suitable video source (not shown in FIG. 1), such as from locally stored video sources and/or from streaming sources in communication through a network. Each video stream 102 may include a plurality of sequential video frames 108. As each video stream 102 is received, the respective video frames 108 may be initially received into a receiving buffer 112. As one example, the receiving buffer 112, as well as the other buffers discussed herein, may be a region of a physical memory (not shown in FIG. 1) used to store temporarily the received video frames 108 of the video streams 102. In some examples, the resource management module 110 or another module or application may access download or otherwise cause the video streams 102 to be received by the receiving buffer 112.

The portions of the video streams 102 in the receiving buffer 110 may be read, accessed, or otherwise received by a region detection module 114. In some cases, the region detection module 114 may detect one or more regions within each video frame 108 and/or within a set of video frames 108 of a particular one of the video streams 102. For instance, the region detection module 114 may detect one or more regions 116 in each frame 108 that include content that visually represents a concept, ontology, or any other visual category. Thus, one detected region 116 may correspond to a face, another detected region may correspond to an object of interest, and so forth. A region 116 may be an area of an image defined using any suitable technique. As one example, a region 116 may be described by geometric coordinates, one or more polygons, or the like that define an area including a visually interesting concept or other features.

In some examples, the region detection module 114 may perform one or more region detection tasks, which may include face detection, building detection, location detection, object detection, logo detection, pattern detection, texture detection, motion detection, and/or detection of regions 116 relevant to various other visual categories. The region detection module 114 may provide region geometry with an associated image portion or the entire video frame to the next stages of the framework 100. In some cases, the detected region 116 may be the entire image of the video frame 108, such as in the case in which the indexing and/or annotation are based on entire image frames.

Further, the region detection module 114 may provide single region geometry for multiple sets of video frames for indexing tasks that involve multiple video frames 108. For example, in motion estimation tasks or motion segmentation tasks, multiple sequential video frames 108 may be analyzed by the region detection module 114. The region detection module 114 may include computational processes and/or algorithms that are capable of detecting region boundaries of regions of interest corresponding to the aforementioned visual categories. The region detection module 114 may further take into consideration similar visual content that may be categorized and stored in a storage 118 associated with the framework 100.

After one or more regions 116 are detected within the respective video frames 108 by the region detection module 114, the detected geometry and image portions are provided to, or otherwise received by, a feature extraction module 120, which may determine one or more features 122 that may be extracted from or otherwise determined from a detected region 116. For example, the feature extraction module 120 may extract one or many features 122 that represent visual properties of a particular region 116 of an image of a video frame 108. The determined features 122 may be any sort of mathematical representation that essentially represents the image within the detected region 116 and/or within the entire video frame 108. Thus, each feature 122 may correspond to at least one mathematical representation that represents, at least in part, visual properties of at least one of a region of a video frame, an entire image of the video frame, or multiple regions of the video frame. These mathematical representations of the detected regions of interest may be subsequently used during indexing and/or annotation, as discussed additionally below. After the respective features 122 are determined from the respective detected regions 116 of the video frames 108, the individual video frames 108, or detected regions 116 of individual frames 108, are sent to respective pipelines 104 so that each respective pipeline 104 may perform its designated video analysis task to enable indexing of the associated video frame 108 and/or detected region 116. Subsequently, the output of the pipelines 104 may enable additional video analysis, such as indexing, annotation, and post processing based on video analysis results from video analysis tasks performed on the detected regions 116 and the corresponding features 122.

In some examples, the video analysis of a detected region 116 may be performed by comparing the detected region 116 to similar visual content in indexed profiles 124 stored in the storage 118. As one example, the detected region may be compared with image content contained in or associated with similar indexed profiles 124 in a database 126 maintained in the storage 118. For instance, the respective pipeline 104 may perform the comparison and recognition, and may select a matching index profile 124 (if a match exists) based on mathematical and/or logical criteria that may be used to determine a match within a particular visual category for indexing. As one example, the match may be determined within a threshold level of confidence. As another example, an intelligent computational algorithm, or other suitable algorithms, logic rules, statistical models, or the like, may be employed to attempt to locate a corresponding indexed profile 124. For instance, the computational algorithm may include mathematical and/or logical components and may employ artificial intelligence techniques for determining whether a particular region or frame matches or otherwise corresponds to a particular indexed profile 124.

Each indexed profile 124 may be an index entry that includes identifying information and one or more associated images. For example, an indexed profile 124 for Barak Obama may be indexed under a profile name "Barak Obama" and the indexed profile 124 may include associated visual or related multimedia content, such as a plurality of images of Barak Obama's face. Thus, if a particular frame 108 to be indexed, or a detected region 116 of the particular frame 108, has been determined by the region detection module 114 to include a face, the particular frame 108 or at least the detected region 116 may be directed to a facial recognition pipeline 104 that may compare the face in the detected region 116 to images of faces maintained in the plurality of indexed profiles 124. If the pipeline 104 determines there is a match with the one or more images in a particular indexed profile (e.g., within a threshold level of confidence, or based on the determination of a computational algorithm), the pipeline 104 may indicate that the particular region corresponds to the matching indexed profile 124.

Subsequently, in some instances, an indexing module 128 may associate (i.e., index) the particular video frame 108 with the particular indexed profile 124 based at least in part on the region 116 matched by the pipeline 104. Further, in some cases, an individual video frame 108 may match more than one indexed profile 124, such as in the case that multiple regions 116 in the same video frame 108 are matched to multiple different indexed profiles 124. Thus, the indexing module 128 may index a region, a set of regions, a video frame, and/or a set of video frames based on the indexing information received from the pipelines 104. In some examples, associating a particular video frame 108 with a particular indexed profile 124 may include assigning meaningful and relevant textual, visual, and/or numeric description to the particular region, set of regions, video frame, or set of video frames. Further, the indexing module may aggregate different region indexes relevant to a particular frame, such as for determining a context of the video frame, and/or for assigning a new index based on the video frame, or based on consideration the multiple indexes of the regions corresponding to the video frame. Furthermore, in a situation in which the computation on the features 122 of a particular video frame 108 is simple, the indexing may be performed by the region detection module 114 or by a particular pipeline 104, rather than by the indexing module 128.

To recognize the plurality of different visual categories that may be present in the video frames 108, some implementations herein may employ a plurality of parallel pipelines 104 in which each pipeline 104 may be dedicated for recognizing a particular visual category. As one example, suppose a first pipeline 104(1) may be designated for recognizing faces, a second pipeline 104(2) may be designated for recognizing objects, a third pipeline 104(3) may be designated for recognizing locations, and an Nth pipeline 104(N) may be designated for recognizing yet another visual category. Thus, some implementations herein may employ parallel pipelines 104 designated for indexing different categories of visual content, rather than merely assigning a particular video stream 102 to a particular pipeline.

After the feature extraction module 120 has determined or computed features in regions detected by the region detection module 114, the determined feature representations may be used for providing a particular frame 108, or a region 116 detected within the video frame 108, to a relevant pipeline 104 of the plurality of pipelines 104. Based on the context of the respective video streams 102 (e.g., drama, wildlife, engineering, sports, etc.), the frequency of the appearance of some visual categories may vary. In such cases, more pipelines 104 may be allocated for recognizing a particular visual category that appears more frequently within the particular type or genre of video streams 102. Several examples of allocating and/or reassigning pipeline queues 106 are discussed additionally below.

After the one or more detected regions within each video frame 108 have been processed in the pipelines 104 (e.g., by performing video analysis, which may include index profile matching and/or indexing-based computations), subsequent indexing of the video frames 108 may be performed by the indexing module 128. The indexing module 128 may associate textual, numeric, and/or visual meanings with one or more detected regions 116 within a video frame 108. For instance, indexing performed by the indexing module 128 may also take into consideration indexing of one or more regions 116 of multiple video frames 108. In some cases, the indexing module 128 may aggregate the index information associated with a plurality of regions 116, and an entire frame or set of frames may be associated with a particular indexed profile 124, or other index information, based on one or more visual categories that are associated with the frame or set of frames.

In some examples, the plurality of pipelines 104 may not finish processing of multiple detected regions 116 in the plurality of video streams 102 at the same time. As one example, suppose that a particular video frame 108 has two different detected regions 116, such as a first region corresponding to a face, and a second region corresponding to an object. Further, suppose that the pipeline 104(1) for recognizing a face may take longer than the pipeline 104(2) for recognizing an object. Accordingly, to accommodate the delay that may take place in the first pipeline 104(1) prior to indexing of the particular video frame 108 by the indexing module 128, the indexing information for the detected regions 116 from each frame 108 may be buffered in an indexing buffer 130. Thus, in the example above, the indexing buffer 130 may first receive video frames 108 and indexing related information (i.e., indexing information) for the associated video frames 108 related to the recognized objects in the video frames 108, referred to as indexing information.

Subsequently, in the example mentioned above, when the indexing buffer 130 has received the indexing information for both the face and the object recognized in the particular video frame 108, the indexing module 128 may associate the particular video frame 128 with one or more matching indexed profiles 124 in the database 126, if such matching index profile(s) 124 were located by the respective pipeline. Accordingly, after the video frames 108 have been indexed, e.g., have had indexing information associated with the respective video frames 108, the indexing information corresponding to the individual video frames 108 may be stored in the storage 118, such as by associating particular indexed profiles 124 with particular video frames 108. Additionally, or alternatively, as discussed below, the indexing information may be stored at least temporarily in a log data structure maintaining information about recently processed video frames, referred to herein as an indexing, annotation and search history (IASH) log (not shown in FIG. 1).

In some cases, the indexing buffer 130 may receive image regions 116, whole image video frames 108, and/or associated indexes or other indexing information. The indexing information may be stored are stored as metadata in the IASH log, as discussed additionally below, or in another suitable storage location. As one example, suppose that the region detection module 114 recognizes multiple regions 116 in a particular video frame 108, e.g., three regions 116 that correspond to President Obama's face, President Clinton's face, and the flag of the USA, respectively. The indexing buffer 130 may receive these three regions 116, along with indexing information or other recognition information provided by respective pipelines 104 that performed video analysis tasks on the respective regions 116. The indexing module 128 may add one or more entries to the IASH log to indicate that this particular video frame 108 has three associated indexes, e.g., as face/Obama, face/Clinton, and object/USA flag.

As another example, suppose that the region detection module 114 detects three regions 116 in a particular video frame, e.g., a first region for a person's face and two other regions related to a pose estimation task. For instance, a particular pipeline 104 may be used to perform the pose estimation task, such as by using the particular pipeline 104 for performing numerical calculations on the respective features 122 of the two regions 116 related to pose estimation. As an example, the pipeline may determine a certain matrix, vector, or the like, associated with pose estimation for a particular region 116. This information may be stored as metadata in the IASH log and associated with the particular region 116, which is stored temporarily in the indexing buffer 130. In this case, the indexing module 128 may perform further indexing such as for using the pose estimation to associate another region with a particular indexed entry, determining an augmentation for an associated frame, or the like.

As still another example, suppose that the region detection module 114 detects three regions 116 in a particular video frame. Further, suppose that video analysis tasks performed by one or more pipelines subsequently result in recognition and indexing of a person, a football and a scoreboard. In certain context recognition scenarios, having these three indexes associated with a particular video frame 108 may enable a context to be determined and assigned. For instance, the three regions-person, football, scoreboard-may be used to determine that a context to associate with the particular video frame is a football game.

Furthermore, the indexed video frames 108 may also be buffered in a play out buffer 132. For instance, to avoid delays in play out 134 of video in real time, near real time, and/or to assemble the processed frames in timely manner, the indexed video frames 108 may be stored directly into the play out buffer 132. Play out 134 may represent any suitable video related output, such as storage 118 or other storage, video streaming, media player play out, a broadcasting play out server, a web browser, and so on.

An annotation module 136 may perform annotation of particular video frames 108 stored in the play out buffer 132. As one example, the annotation module 136 may allocate a set of video frames 108 to a semantic video segment based on the indexing results. For example, annotation may include identifying and/or allocating video segments in which the same person appears, e.g., if Barak Obama has been recognized as appearing in a plurality of sequential video frames, the annotation module may annotate this set of frames as a video segment, and the video segment may be indexed to (i.e., associated with) the Barak Obama indexed profile 124.

In addition, one or more post processing modules 138 may perform various other post processing tasks, such as video segment generation, image censorship, image augmentation, and/or identification and retrieval of related content, based at least in part on the indexing information corresponding to the particular video frames 108 and/or particular image regions 116. Following annotation and/or post processing of the video frames 108, the video frames 108 may be stored in or may remain in the play out buffer 132. For instance, the video frames 108 that have been annotated, censored, augmented, combined into video segments, or the like, may be stored in the play out buffer 132 to enable play out 134 of some or all of the video frames 108, such as in real time or near real time.

As mentioned above, based at least in part on the annotation and/or the indexing, various post processing tasks may be performed on the video streams 102. Such post processing tasks may potentially include generating video segments in which annotated video frames 108 are aggregated or otherwise grouped into video clips or other video segments 140 and stored in a file store 142 in the storage 118. As another example, post processing may include censorship management based at least in part on the indexing and/or annotation results. As still another example, post processing may include augmenting selected video frames 108 based at least in part on the indexing information and/or annotation results. For instance, as one example, augmentation may include augmenting roads in a video segment 140 and providing navigational instructions corresponding to the augmented roads. As another example, augmentation may include adding text, such as an advertisement or other information to a video frame.

In still other instances, post processing may include searching for and retrieving related content 144 that is related to particular index information for a particular video frame 108 or video segment 140. For instance, related content 144 may include videos, images, audio, text, multimedia, website URLs, web content, or any combination thereof, related to the particular video frame. In some examples, the related content 144 may be retrieved from local storage, remote storage, a website, or any other suitable storage location.

Figure 2:
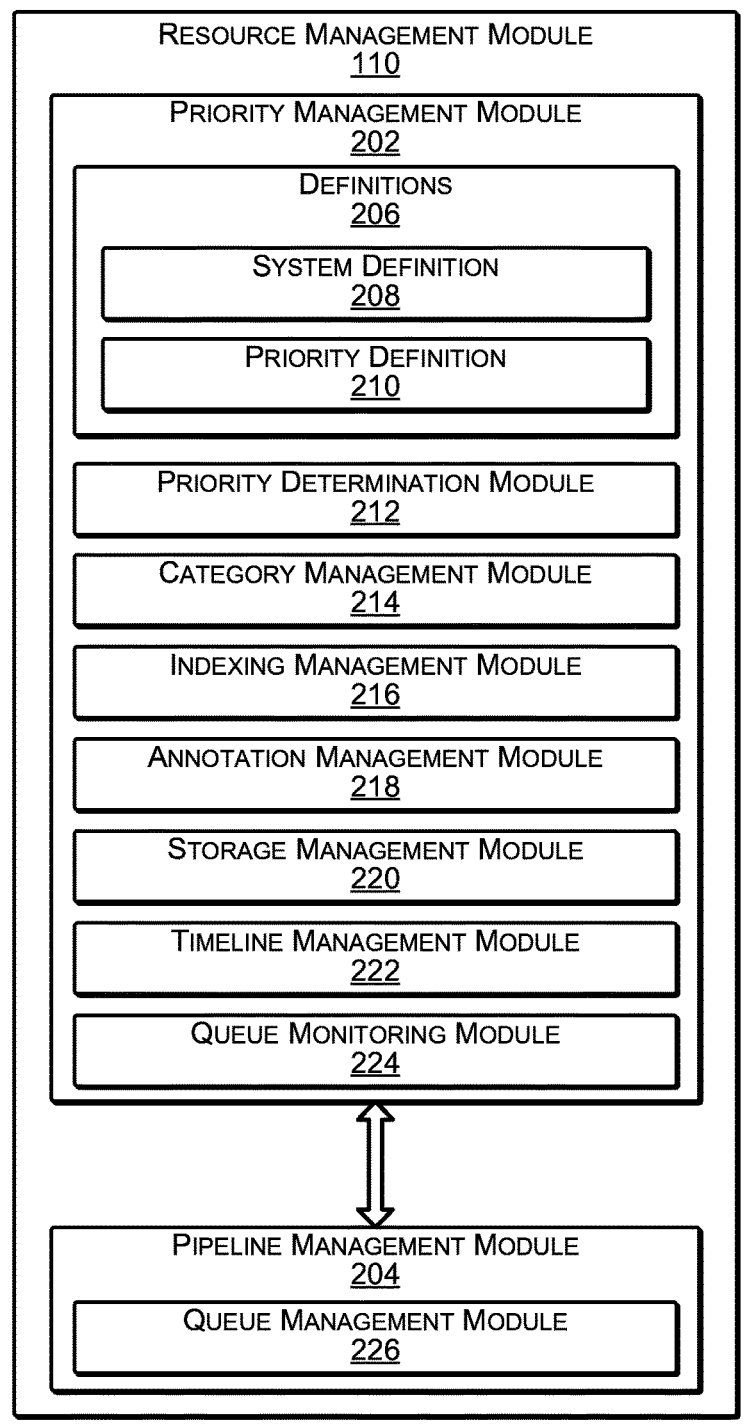
FIG. 2 illustrates an example configuration of a resource management module according to some implementations.

FIG. 2 illustrates an example configuration and select modules of the resource management module 110 according to some implementations. The resource management module 110 may manage the overall operation of the video analysis framework 100 discussed above. For instance, the resource management module 110 may monitor and/or control the various operations discussed above with respect to FIG. 1 while also ensuring the operations are performed in accordance with any real time demands for video play out or any other time-related constraints that may be imposed.

In this example, the resource management module 110 includes a priority management module 202 and a pipeline management module 204. The priority management module 202 may perform operations that include controlling overall operation of the framework 100 and an associated system, which may include a single computing device or multiple computing devices, as discussed additionally below. The priority management module 202 may perform operations based in part on definitions 206. The definitions 206 may include a system definition 208 and a priority definition 210. The system definition 208 may include information about the computer system that is performing the video analysis, such as available computing resources (e.g., processor(s), memory, storage, communication interfaces) and related information.

In some examples, the priority definition 210 may be an XML (extensible markup language) file or other suitable file type or data structure that includes a hierarchical order of priority associated with various tasks performed during the video analysis described above. For example, the priority definition 210 may include an order of priority for video analysis tasks, indexing tasks, annotation tasks, post processing tasks, and so forth. The order of the priorities for the various tasks may be determined automatically by a priority determination module 212, or may be defined manually, such as by a user or an application. In some instances, the manual defining of the priority definition 210 can be set via a system interface (e.g., via an application programming interface (API), a graphical user interface (GUI), a settings file, etc.) able to communicate with the resource management module 110. In the case that an application sets the priorities in the priority definition 212, the priorities assigned to the respective tasks for a particular application may be received through an API by direct communication from the application. Additionally, or alternatively, one or more priorities may be assigned to respective tasks based on an input received from a user via a GUI or other user interface. For instance, the user may be presented with a GUI that enables the user to assign priorities to particular tasks, such as according to the user's preferences.

On the other hand, the priority determination module 212 may determine automatically and dynamically priorities for particular tasks, such as for prioritizing pipeline processing related to particular visual categories as discussed above. In some cases, the priority determination module 212 may determine the order of priority for certain tasks in the priority definition 210 based on detected contexts of one or more video streams processed at a certain time, such as in the recent past. For example, the IASH log mentioned above (not shown in FIG. 2), may maintain information about recently processed video frames, and may be used to determine and/or change the order of priority automatically and, in some cases, while video analysis is ongoing. The IASH log may include information related to the video analysis tasks, indexing tasks, searching tasks and annotation tasks carried out according to the framework 100. The IASH log may also include information related to various post processing tasks performed according to the framework 100.

The IASH log may further include information related to the frequency of occurrence of various visual categories and/or indexed profiles. For example, the priority determination module 212 may change the priority definition 210 based on the frequency occurrence of the various visual categories that have recently appeared in the video streams being processed. Thus, recognition tasks and other video analysis tasks related to visual categories that have recently been detected with a greater frequency than those related to visual categories that have not been recently detected may be given a higher priority in the priority definition 210. Accordingly, the priority determination module 212 may determine respective priorities based at least in part on current and recently displayed frames. Since the indexing details may be maintained in the IASH log, the visual categories or other context of the current and recently displayed frames may be determined from the information in the IASH log.

As one example, the priority determination module 212 may calculate the frequency of different visual categories that have appeared within the last 5 or 10 minutes, such as faces 40%, vehicles 30%, logos 20%, and so on. Based on these frequencies, the priority determination module 212 may assign respective priorities for video analysis tasks, indexing tasks, annotation tasks and post processing tasks, where the priority of a given task may be based at least partially on the frequency of a particular index or visual category that has appeared within last 5 or 10 minutes. In addition, the priority determination module 212 may assign priorities to individual indexes, such as a faces: Obama index, as one example. Further, the assignment of priorities may be weighted for different applications or different genres of video streams. For example, when processing sports videos, there may be a higher weighting on giving priority to a recognition task for recognizing an object, such as a ball, while in a news video, there may be higher weighting on giving higher priority to recognizing faces.

Further, as incoming video streams are processed, the IASH log may be updated continually, which may result in the priority definition 210 being updated continually. Moreover, the priority determination module 212 and/or the resource management module 110 may discard older entries in the IASH log, such as based on a staleness or other time-based threshold. Additionally, in some cases, the priority definition 210 may be changed or otherwise updated based on both a manual definition and an automatically determined definition. For instance, the manual definition may define limits on which tasks may be given priority in certain situations, which tasks should always have a high priority, and so forth.

In addition, a manual priority definition may set forth an ontology, priority determination procedures, or other priority determination rules, which may be applied for automatic priority definition. Thus, the technique used for automatic priority definition may be based on the priority determination rules, which may be defined manually, by an application, or the like, as discussed above. As one example, suppose the system herein has a plurality of pipelines that perform video analysis, including at least one pipeline for a logo recognition task, at least one pipeline for a facial recognition task, and at least one pipeline for location recognition, and suppose that the system has automatic priority definition enabled. Further, suppose that suddenly there may be a set of frames coming having a large number of faces in the set. Consequently, the priority for the face detection task may not increase proportionally, but may change according to a mathematical and/or logical formula. As one non-limiting example, the new priority for the facial recognition task may equal the prior priority for the facial recognition task plus the log of the frequency of faces in the set of frames, or any other suitable function.

In some examples, the priority definition 210 may be initially defined by a user or application, and subsequently modified by the priority determination module 212. In other examples, there may be no initial priority definition, and the priority definition module 212 may establish the priority definition 210 as video frames are received. Moreover, the resource management module 110 may control the overall operation of the video analysis system based at least in part on the system definition 208 and the priority definition 210.

As discussed above with respect to FIG. 1, although the indexing module 128 and the annotation module 136 may perform tasks for multiple video streams 102, efficient resource management may enable meeting of real time demands. However, the available computational resources, such as processing capacity, memory capacity, bus capacity, storage capacity, and so forth, may not be adequate to fulfill all the demands placed on a real time multiple video streaming system. Further, the computational time used by some computational elements (such as various recognition algorithms or other video analysis tasks) may vary. To address such situations, some implementations herein enable handling of real time demands based on the priority definition 210. For example, a surveillance system may have a high priority in indexing, annotation and searching for human faces while giving a lower priority for objects such as vehicles. As another example, for a real time video-based advertising application, some of the indexes may enable earning of higher revenue than others and, therefore, a higher priority may be given to processing video frame or regions corresponding to those higher priority indexes. Consequently, some implementations include priority-based resource management that employs the priority definition 210.

As one consideration, the balancing of resources for the pipelines 104 discussed above may be used to meet real time demands and to avoid missing any important indexes. As another consideration, it may be desirable for the indexing, annotation and other post processing tasks to be conducted in real time while meeting demands for video play out. Accordingly, in some examples, the resource management module 110 and other modules herein may operate based on the priority definition 210 to meet the real time demands. Further, when available computational resources are limited, inevitable skipping operations (e.g., skipping frames, indexing tasks, or any other tasks) are also based on the priority definition 210. For example, lower priority tasks or indexes or any related operation may be skipped in order to give more priority to higher priority tasks, indexes, or operations in order to meet real time or time/resources related constraints. Further, in some cases, skipped tasks may be tracked using the IASH log, and these skipped tasks may be processed or otherwise performed at a later time, such as through batch processing or using any other suitable technique when sufficient system resources become available.

In the illustrated example, the priority management module 202 further includes a category management module 214, which may determine one or more lower priority tasks that may be discarded or skipped if it is desired to free up some system resources for higher priority tasks corresponding to different visual categories. The priority management module 202 further includes an indexing management module 216, which may ensure that the indexing occurs according to a desired timeline. For example, the indexing management module 216 may instruct the indexing module 128 to discard one or more indexing tasks in order to maintain a desired timeline for video outplay. When determining which indexing tasks to discard, the indexing module may refer to the priority definition, and may select indexing tasks associated with a lower priority video analysis task and/or visual category, when selecting indexing tasks to be discarded.

The priority management module 202 further includes an annotation management module 218, which may ensure that the annotation occurs according to a desired timeline, and which may provide information to the annotation module, such as priority definition information and/or system definition information. For instance, as discussed below, the annotation module may determine a priority associated with particular indexed profiles from the priority definition when determining whether to annotate a set of video frames.

The priority management module 202 further includes a storage management module 220, which may manage a load on the storage 118, such as for accessing and storing information on the storage 118 by the various other modules in the video analysis system. The priority management module 202 further includes a timeline management module 222, which may provide overall management of the framework 100 and the various modules in order to meet a desired timeline for video play out, such as when real time play out is desired. The priority management module 202 further includes a queue monitoring module 224, which may monitor the queues for each of the pipelines, such as for determining which queues are full, which pipelines may need additional queues assigned, and so forth. For example, if a particular queue is full, the video analysis system may wait until space has opened in the particular queue before an additional task is assigned to the particular queue.

In addition, the pipeline management module 204 may oversee the creation and assignment of pipelines 104. The pipeline management module 204 may include a queue management module 226. The queue management module 226 may create queues for particular pipelines and/or delete queues for particular pipelines, as well as reassigning or otherwise allocating queues to particular pipelines.

The resource management module 110 may reallocate queues to pipelines for various video analysis tasks based on the current priority definition 210. For example, if facial recognition has a highest priority, and the queue for the facial recognition pipeline 104(1) is full, then, based on the priority, the queue monitoring module 224 may send an instruction to the queue management module 226 to allocate an additional queue to the facial recognition pipeline 104(1). If there are no available queues, the additional queue may be reassigned from a pipeline that performs a lower priority task. For example, suppose that vehicle recognition currently has a lowest priority of the active pipelines. Thus, based at least in part on the priority definition 210, the queue monitoring module 224 may instruct the queue management module 226 to reassign the queue from the vehicle recognition pipeline to the facial recognition pipeline. The vehicle recognition tasks in the queue may be discarded.

FIGS. 3, 5-9 and 12 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks and systems described in the examples herein, although the processes may be implemented in a wide variety of other environments, frameworks and systems.

Figure 3:
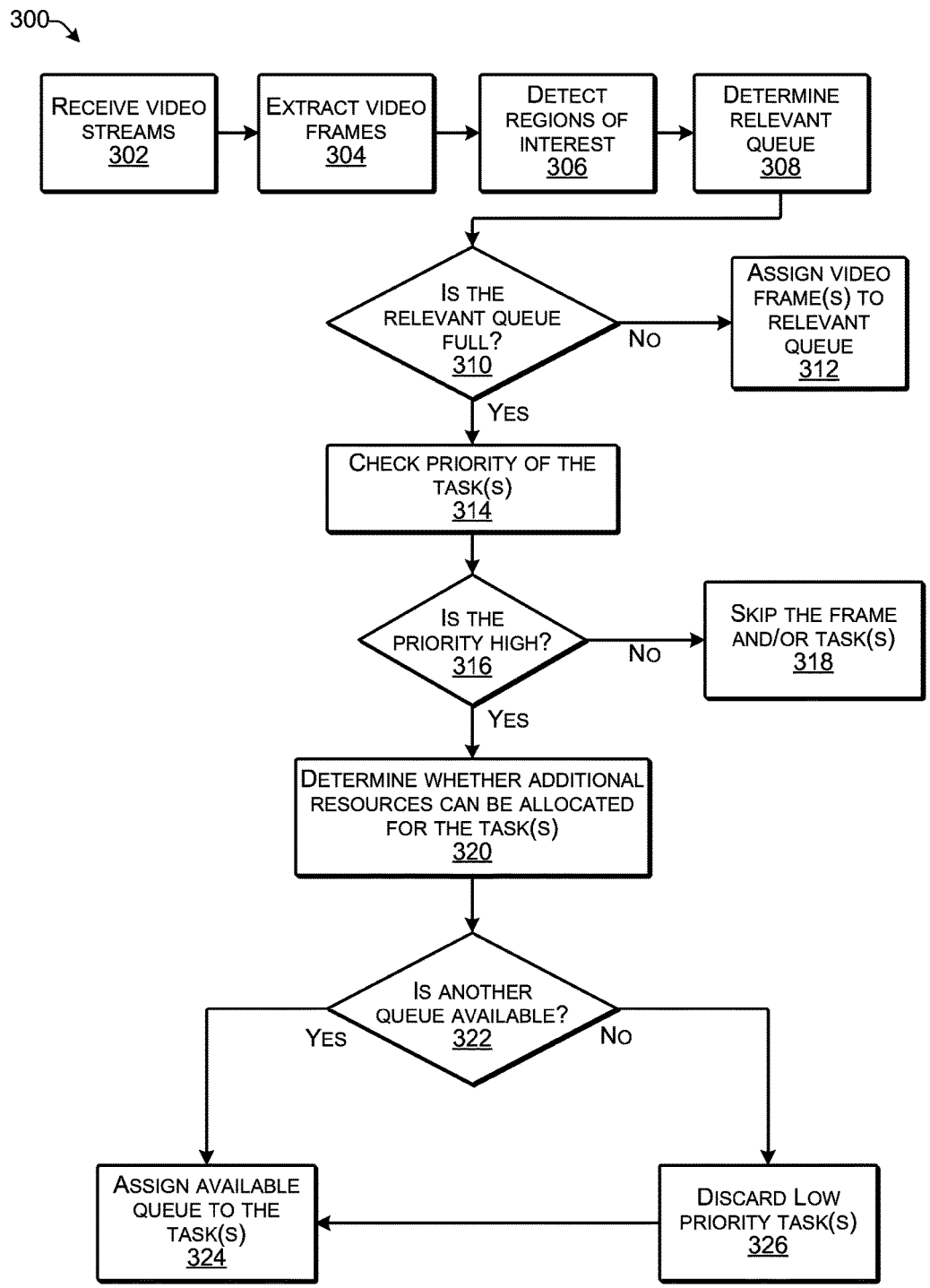
FIG. 3 is a flow diagram illustrating an example process for assigning queues to video analysis tasks according to some implementations.

FIG. 3 is a flow diagram illustrating an example process 300 for assigning queues to detection tasks according to some implementations. In some examples, the process 300 may be executed by the resource management module executing on at least one computing device.

At 302, the computing device may receive a plurality of video streams. For example, as discussed above with respect to FIG. 1, the plurality of video streams may be received into a receiving buffer.

At 304, the computing device may extract video frames from the received video streams. For example, the computing device may identify a plurality of video frames corresponding to each video stream.

At 306, the computing device may detect regions of interest associated with individual video frames. For instance, a region detection module may identify one or more detected regions of interest in the image associated with an individual video frame.

At 308, the computing device may determine a relevant pipeline queue corresponding to at least one detected region of interest. For example, the individual pipelines may be designated for processing particular video analysis tasks for respective visual categories such as facial recognition, object recognition, location recognition, motion recognition, and so forth. Accordingly, based on a visual category associated with the detected region of interest in a particular video frame, the computing device may determine to which pipeline to send the particular video frame.

At 310, the computing device may determine whether the queue of the relevant pipeline is already full.

At 312, if the relevant pipeline queue is not full, the video frame may be assigned to the relevant queue so that the video analysis task of recognizing and indexing the video frame, or at least the detected region of the video frame, may be performed via the relevant pipeline queue.

At 314, on the other hand, if the relevant pipeline queue is full, the computing device may check the priority associated with the video analysis task. For example, the resource management module executing on the computing device may refer to the priority definition, as discussed above with respect to FIG. 2, to determine the priority for the particular video analysis task.

At 316, the computing device may determine whether the video analysis task is a high priority video analysis task. For instance, in the case of a surveillance system, a facial recognition task may be a high-priority task, while a scene recognition task may be a low priority video analysis task.

At 318, if the computing device determines that the task is a low priority task, the computing device may skip the video analysis task for the particular frame and/or may skip processing of the frame altogether.

At 320, on the other hand, if the computing device determines that the associated recognition task is a high-priority video analysis task, the computing device may determine whether additional resources may be allocated for the video analysis task. For instance, the resource management module may refer to the system definition 208 discussed above with respect to FIG. 2 to determine whether additional resources are available.

At 322, the computing device may determine whether another pipeline queue is available to be reallocated for the video analysis task.

At 324, if the computing device determines that an available pipeline queue is not currently being used, the computing device may allocate that pipeline queue to be used for the video analysis task.

At 326, on the other hand, if the computing device determines that another pipeline queue is not currently available, the computing device may discard a low priority task to free up a pipeline queue to be used for the higher priority task. In some examples, the low priority task may be discarded entirely, while in other examples, the low priority task may be saved for processing at a later point in time. Following discarding of the low priority task, the freed up queue may be assigned to the high priority video analysis task, as discussed above at 324.

Figure 4:
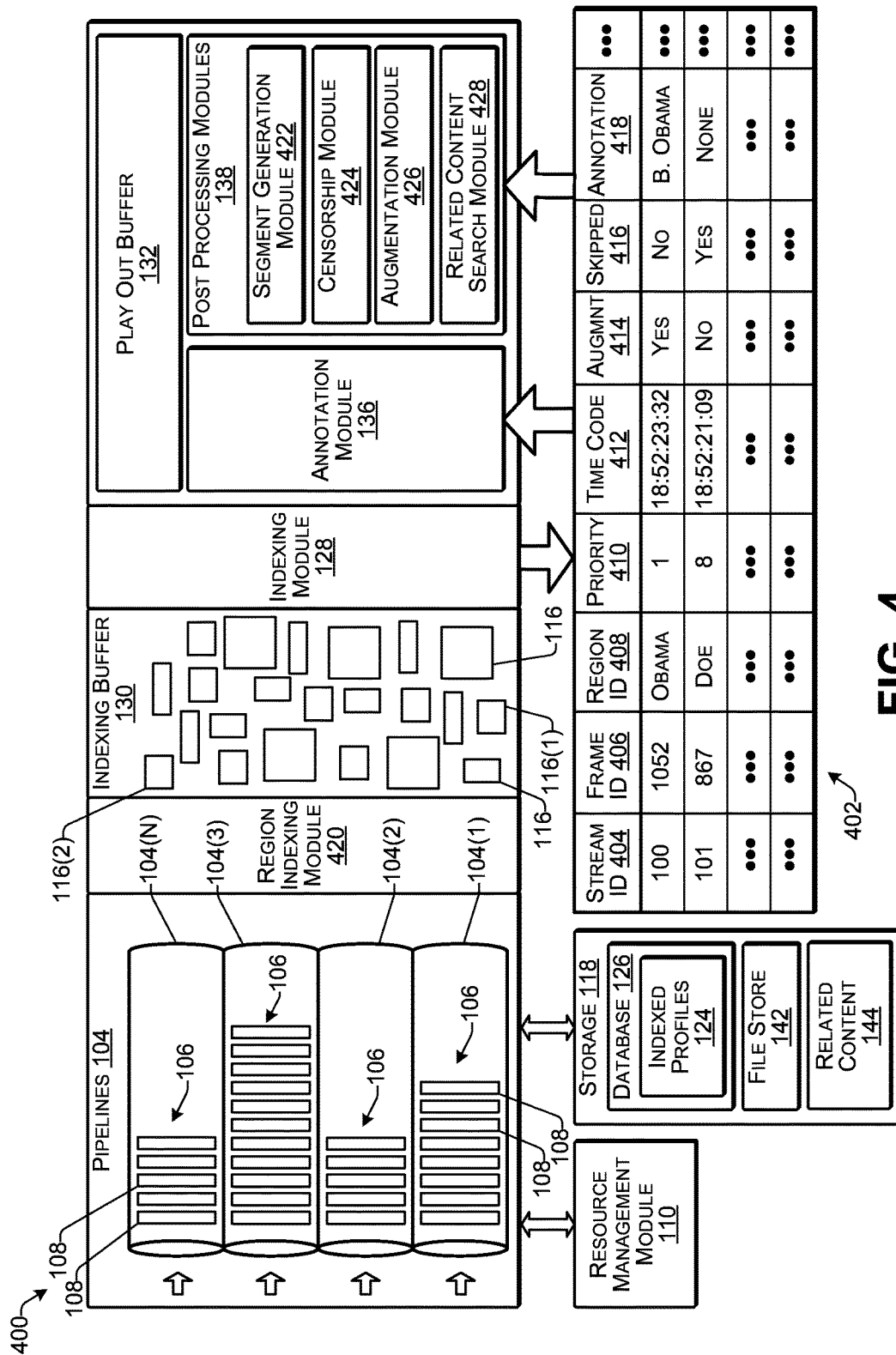
FIG. 4 illustrates an example framework for parallel pipeline processing of multiple video streams according to some implementations.

FIG. 4 illustrates an example framework 400 for indexing, annotation and/or searching of multiple video streams in parallel according to some implementations. The example framework 400 corresponds at least in part to the example framework 100 discussed above with respect to FIG. 1, and includes additional details as discussed below. The framework 400 illustrates an example of the indexing, annotation and search history (IASH) log 402, discussed above. The IASH log 402 may be any suitable type of data structure, multiple data structures (e.g., a set of tables), etc., for maintaining the IASH information. For instance, multiple IASH logs 402 may be maintained, which may include separate IASH logs for regions, video frames, video streams, or other structures, as necessary.

In the illustrated example, the IASH log 402 includes a column for a video stream identifier (ID) 404, which may indicate a unique or otherwise individually distinguishable identifier for a particular video stream of the plurality of video streams 102 discussed above with respect to FIG. 1. The IASH log 402 may further include a column for a video frame ID 406, which may be a unique otherwise individually distinguishable identifier for a particular video frame from the identified video stream. The IASH log 402 further includes a column for a region ID 408, which may be an individually distinguishable identifier for a particular region associated with the corresponding video frame that has been identified, such as by a video analysis task performed by one of the pipelines 104. For instance, if the region corresponds to a face of a person, the region ID 408 may be an identifier associated with a particular index profile 124 for that person.

As an example, suppose that the first entry in the IASH log 402 (i.e., the row including frame ID 1052) corresponds to a detected region 116(1) including a face that has been recognized by the first pipeline 104(1) as Barak Obama. When the pipeline 104(1) performs video analysis on another region 116(2) from another video frame 108, rather than accessing the database 126, the pipeline 104(1) may first access the IASH log 402 to attempt to match the region 116(2) with other regions 116 that have already been matched with an indexed profile 124. As one example, the current region 116(2) may be compared with the previously identified region 116(1) to determine whether there is a match within a threshold level of confidence. As another example, a computational algorithm may be used to attempt to locate a corresponding indexed profile 124. If a matching indexed profile 124 is located, the second region 116(2) may also be associated with the indexed profile 124. On the other hand, if none of the recently matched regions matches the second region 116(2), the pipeline 104(1) may access the database 126 to attempt to locate a match. However, as there will often be a match in the IASH log 402, considerable time can be saved by searching the IASH log 402 before searching the database 126.

The IASH log 402 further includes a column for a priority associated with a task for processing video frame 406 and/or the region ID 408. For instance, different levels of priority may apply to different processing task performed by different pipelines 104. The IASH log 402 further includes a column for a time code 412, which may indicate a time code associated with the particular video frame 406. The IASH log 402 further includes a column for an augment indicator 414, to indicate whether the video frame has been augmented. The IASH log 402 further includes a column for a skipped indicator 416, which may indicate whether a processing task for the video frame was skipped, such as due to inadequate resources or imposed time constraints. The IASH log 402 further includes a column for annotation information 418, which may provide information as to how the corresponding video frame has been annotated, if any. For instance, the annotation information may be added to the IASH log 402, or alternatively, a pointer to the annotation information for the frame may be included in the log. The IASH log 402 may further indicate the case in which a particular video frame has not been annotated. Furthermore, while a plurality of columns of the IASH log 402 have been described in this example, additional columns not shown in this example may also be included, such as a column to indicate whether censorship is applied; a column to indicate whether related content has been located and/or a storage location of the related content; a column to indicate whether the frame includes additional regions that have been matched to an index profile; a column to indicate a visual category of the corresponding frame or region; and so forth.

As one example, if related content has already been located for the first entry in the IASH log 402 based on the first region 116(1), then rather than searching the storage 118 or other locations for the related content again for the second region 116(2), the related content may instead be located from the first entry in the IASH log 402 for the first region 116(1). As another example, related content search may also take into account a particular user's action history with respect to the content corresponding to certain indexed profiles. Accordingly, the related content search may employ a combined methodology that includes the particular user's search history, as well as recent indexing and annotation history indicated in the IASH log 402.

In the example of FIG. 4, the framework 400 includes a region indexing module 420, which may be a portion of the indexing module 128, or a separate module. The region indexing module 420 may assign an index to each video frame 108 by aggregating region index information provided by the pipelines 104. The region indexing module 420 may compare the content determined for processed features 122 with similar content for attempting to match a region 116 to an index profile 124. For each of the regions 116 or video frames 108 that is matched to an indexed profile 124, the corresponding indexed profile identifier may be saved in the IASH log 402 as a respective region ID 408 associated with a particular video frame ID 406 and/or region ID 408. Further, regions 116 directed to the same face, same object, same location, etc., may be aggregated and indexed according to the subject of the region, in addition to being indexed according to the respective video frame 108. For example, aggregation may include aggregating region indexes to frame indexes, e.g., a particular video frame may have several different region indexes associated with the particular video frame. As one example, a frame index for a particular frame may have region indexes corresponding to Obama, dog and White House. Thus, the indexing module may aggregate all of these indexes for a particular frame.

Further, in this example, the post processing modules 138 include a segment generation module 422, which may generate a video segment from a plurality of annotated video frames that are indicated by the annotations to be related to a particular subject. Further, a censorship module 424 may identify video frames that are to be censored, such as by adding a mosaic to the censored portion or the like. Additionally, an augmentation module 426 may augment video frames such as by adding additional content to the image of the video frames to achieve a desired effect. Furthermore, a related content search module 428 may locate and return related content 144 that is related to a particular video frame based on the annotations and/or index information associated with the video frame. As mentioned above, in some cases, the related content may be located by searching the IASH log, which may enable the related content to be quickly located and provided with the video frame for play out.

In some cases, the indexed frames are stored in the play out buffer 132, and annotation or other post processing operations may be performed. The operations that may be performed in the play out buffer 132, such as video segment generation and other post processing tasks, may also be logged in the IASH log 402 in the row for the corresponding video frame ID 406. Based on the IASH log 402, the resource management module 110, indexing module 128, annotation module 136, and post processing modules 138 may potentially reduce the searching time or computational processing time. For example, since the recent annotation information 418 is included in the IASH log 402, modules may search the IASH log 402 to obtain related annotation information rather than searching the database 126 of index profiles 124 and/or the related content 144 for similar visual content from the storage 118 for generating the best annotation. Therefore, the IASH log 402 may first be searched for finding index information, annotation information, and/or related tasks, and a search of the database 126 and or related content 144 is not performed unless a corresponding indexed profile cannot be found in the recent history provided by the IASH log 402. Further, as mentioned above, the recent history maintained in the IASH log 402 continually updated as new video frames are received. For example, the resource management module 110 may discard older entries of the IASH log 402 based on a threshold, such as based on an amount of time since an entry was added to the log, a number of entries currently in the log, or other suitable threshold for keeping the IASH log 402 of a size that is searchable quickly within a memory.

In some examples, the IASH log 402 may be exported as metadata to external systems maintained by video consumers, such as for linking to broadcast media used by a broadcaster, or other video consumer. The exportation may take place in real time, e.g., as the information is added to the IASH log 402, or may be performed at a later time, e.g., in a batch transfer of IASH log information. For example, information related to frame-based indexes and annotations may be exported to and imported by broadcast media asset management systems that use the information for managing the associated video media. The transfer of this information can be performed via XML, web services, text file, update to a database, API sockets or through any other similar mediums.

As several examples, an external media management system may use the metadata to identify the associated media, such as for determining clip or playlist names, durations, timecodes, or the like. Further, the metadata may describe the associated media, such as for determining the context or identification of the content of the media, e.g., from the index information. For example, during a sport event, keywords like touchdown, goal line, goalpost, etc., may be associated with some video clips. Additionally, the metadata may aid in classifying the associated media, such as to enable the media to be sorted or searched to find a video content for a particular subject or context. Further, this metadata can be linked to the video media that is distributed to subsidiary video consumers, such as local TV stations, from a host broadcaster who organizes and distributes the metadata and associated media using its video servers.

Figure 5:
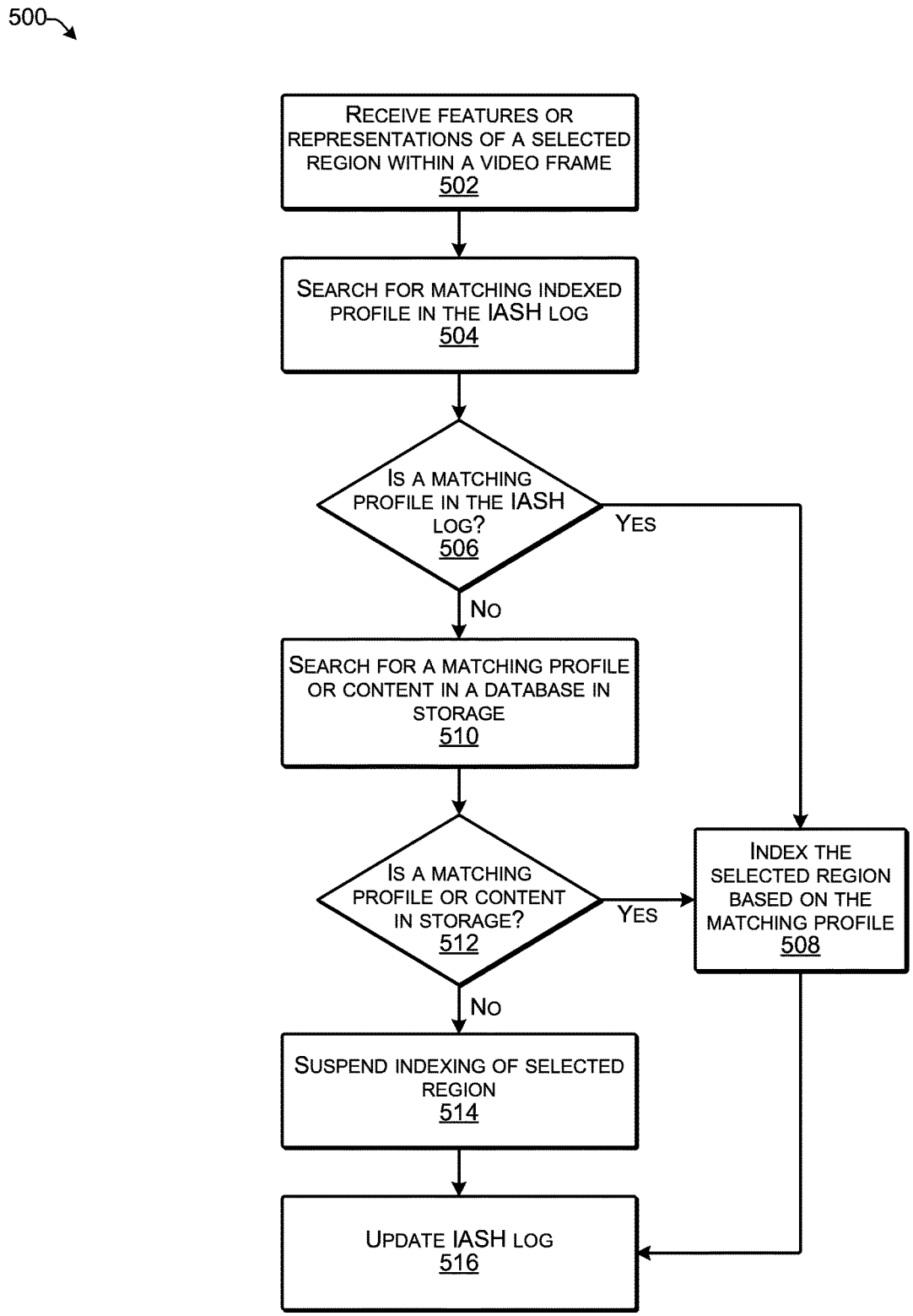
FIG. 5 is a flow diagram illustrating an example process for indexing video frames according to some implementations.

FIG. 5 is a flow diagram illustrating an example process 500 for indexing video frames using the IASH log 402 according to some implementations. The process 500 may be executed by the region indexing module 420 and/or the indexing module 128 (referred to as "the indexing module" in this process) on at least one computing device of a video analysis system. Further, in some examples, as mentioned above, indexing may be performed by the region detection module 114 or a particular pipeline 104, such as in simpler cases.

At 502, the indexing module receives detected features of a detected region within a video frame. For instance, the indexing module may receive the features of a detected region along with other recognition and indexing information provided by a particular pipeline 104 as discussed above.

At 504, the indexing module searches for a corresponding indexed profile in the IASH log 402. As one example, the indexing module may search through the IASH log 402 to locate a corresponding indexed profile that corresponds to the received features within a matching threshold. As another example, the indexing module may utilize an intelligent computational algorithm or other suitable technique to attempt to locate a corresponding indexed profile.

At 506, the indexing module determines whether a corresponding indexed profile has been located in the IASH log.

At 508, if a corresponding profile is located in the IASH log, then the detected region may be indexed based on the corresponding indexed profile. Accordingly, the detected region and/or the corresponding video frame may be indexed and associated with the corresponding profile.

At 510, on the other hand, if a corresponding profile is not located in the IASH log, the indexing module may search for a corresponding indexed profile in the storage 118 by searching for similar indexed profiles or content in the database 126 discussed above.

At 512, the indexing module determines whether a corresponding profile or content has been located in the storage 118. If so, then as discussed above with respect to 508, the detected region may be indexed based on the corresponding indexed profile.

At 514, on the other hand, if a corresponding profile cannot be located in the storage 118, then indexing of the detected region may be suspended. For example, if the detected region corresponds to a face that cannot be matched to an existing indexed profile 124, the region may be merely indexed as a face without including any further indexing information.

At 516, the indexing module may update the IASH log based on the indexing information. For instance, if a corresponding indexed profile was located, the corresponding indexed profile identifier may be added to the IASH log. On the other hand, if a corresponding indexed profile was not located, the corresponding entry in the IASH log may indicate that the indexing of the region was suspended.

Figure 6:
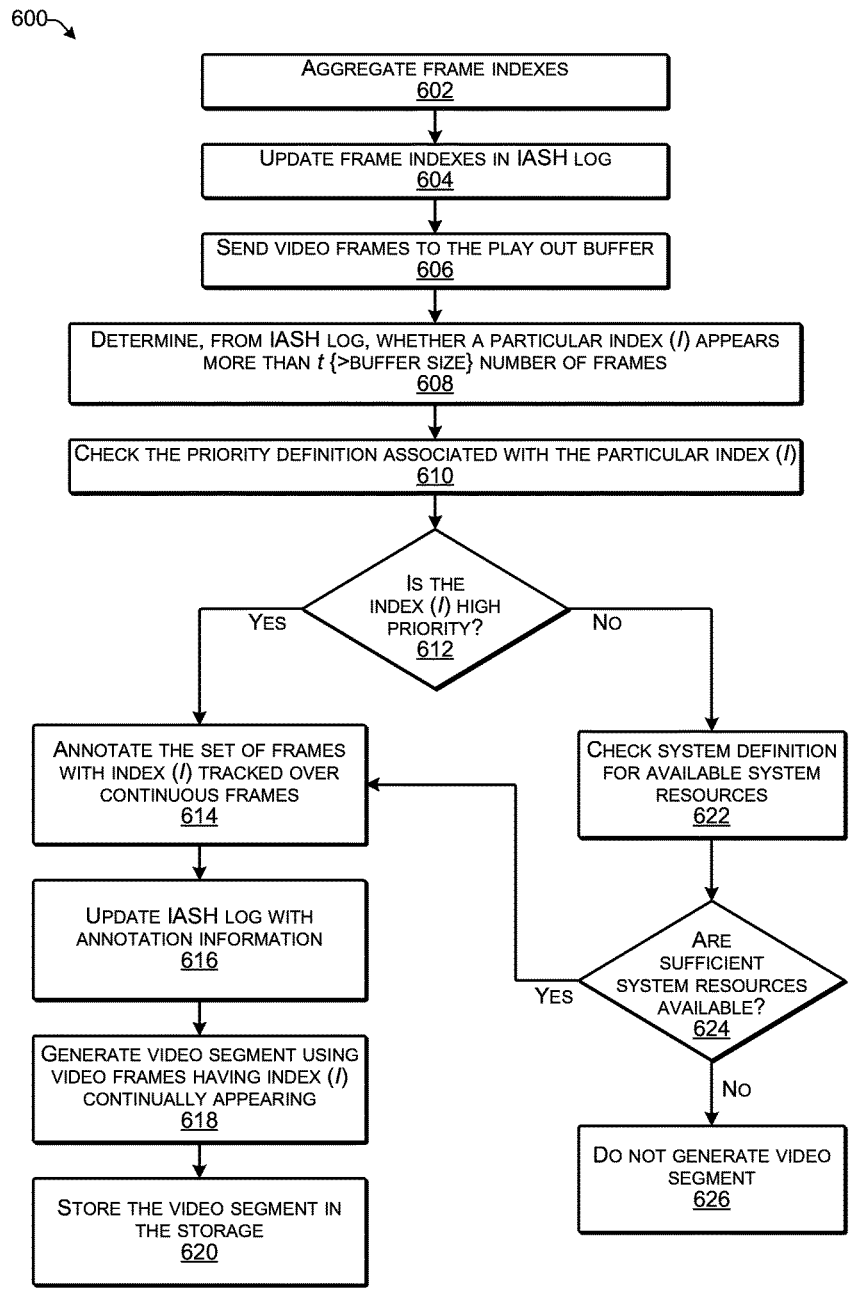
FIG. 6 is a flow diagram illustrating an example process for generating a video segment according to some implementations.

FIG. 6 is a flow diagram illustrating an example process 600 for generating a video segment according to some implementations. For instance, the process 600 may employ the IASH log 402 for faster annotation and segment generation than would otherwise be the case if the IASH log 402 were not used. As mentioned above, the annotation module 136 may determine whether to allocate a set of video frames to generate a semantic video segment based on the indexing results. For example, annotation may include identifying and/or allocating frames in which the same person or object appears. Thus, the process 600 may include annotation-based video segment generation and storage based on most recent indexing and annotation history included in the IASH log. The annotation module 136 may further indicate whether segment generation is to be performed based on information from the resource management module 110 regarding available resources, as determined from the system definition 208, and a priority for the associated indexing task, as determined from the priority definition 210, as discussed above. In some examples, the process 600 may be executed at least in part by the indexing module 128, the annotation module 136, and/or the video segment generation module 422 on at least one computing device in a video analysis system.

At 602, the indexing module may aggregate or otherwise compare a plurality of recent frame indexes. For instance, a video segment may include a set of video frames that are related in some manner and such relations may be indicated by the index information associated with each frame. Accordingly, the indexing module may initially identify frames that are related based on a comparison of the index information associated with the video frames, e.g., each frame may have one or more indexed regions that may be related to indexed regions of other frames. For example, suppose in a particular frame, Barack Obama is appearing next to the White House with a dog, and each of these has been recognized from respective separate regions of the particular frame. These three regions will come to indexing module, which matches them to corresponding indexes. The indexing module 128 may further aggregate these three indexes to the particular frame (Obama, dog, White House). As another example, a surveillance system may include multiple cameras that provide multiple video streams. When a particular person appears at a particular time, that person may be recognized in multiple different video streams from some of the different cameras. These video frames may be aggregated and indexed by the indexing module as all including the same person at about the same time.

At 604, the indexing module may add the index information determined from aggregating and comparing the index information associated with the plurality of frames to the IASH log for each corresponding video frame.

At 606, the indexing module may store the video frames in the post processing buffer.

At 608, the annotation module may determine, from the IASH log, whether a particular indexed profile identifying information "index (I)" is associated with more than a threshold t number of frames. For instance, if a region corresponding to a particular index or a plurality of regions corresponding to respective indexes appears consistently in the plurality of frames associated with one or more of the video streams, and the number of such frames is less than a threshold t, which may correspond to the buffer size of the play out buffer 132, that set of frames may be a potential candidate for generating one or more video segments. For instance, if the play out buffer holds 100 frames, the number of frames for generating a video segment should be less than 100. The continual occurrence of frames associated with a particular indexed profile may be determined from the entries in the IASH log 402. Accordingly, the annotation module 136 searches the IASH log for potential segments and the segment generation module 422 may conduct the segment generation operations on the identified video frames to generate a video segment. However, segment generation may also place some demands on the storage 118 for storing the generated video segments. Accordingly, in some implementations, the segment generation herein may be performed based at least in part on the priority definition 210 determined by the resource management module 110.

At 610, annotation module checks the priority definition associated with the particular index (I) for the identified set of video frames. For example, video frames corresponding to indexed profiles associated with a higher priority may be given a higher priority for segment generation and utilization of storage resources. For example, if the corresponding indexed profile 124 is for a face, the priority for facial recognition tasks may be applied, if the corresponding indexed profile 124 is for detected motion, the priority for motion detection may be applied, and so forth.

At 612, the annotation module determines whether the index (I) is associated with a higher priority in the priority definition 210. For example, there may be a threshold priority level established for annotation of frames associated with a particular indexed profile to proceed. In some examples, the threshold priority level value may vary according to the resources available in the system, e.g., as determined from the system definition 208, while in other examples, the threshold priority level may be a fixed value according to a particular system or a user preference. If the priority level associated with the index (I) is not higher than the threshold priority level, then the process goes to block 622.

At 614, if the index (I) is associated with a higher priority in the priority definition 210, the annotation module may annotate the set of frames corresponding to the index (I). For instance, the annotation module may designate the frames for generation of a video segment if the particular indexed profile associated with the set of frames has an associated priority level that exceeds a threshold priority level.

At 616, the annotation module may update the IASH log 402 to indicate which frames have been annotated with annotation information. Accordingly, if there is an index for a particular frame, the annotation module may store the details of an annotation in the IASH log. Alternatively, if there is not an IASH log entry for a particular video frame, an entry may be created, or the annotation information may be stored elsewhere in a memory or storage. If all the frames in a set of video frames have associated indexes, the annotation module may store the details of an annotation with entries for each frame's respective index. Additionally, if a particular index appears in a particular video stream for more than a certain period of time, the annotation module may annotate the associated frames as a video segment, and may store the video segment. As annotation is performed, the continuous appearance of a particular index may be tracked using the IASH log. Further, as discussed additionally below, in some examples, the indexing information, annotation results, and other information in the IASH log may be exported to other external systems, such as via an XML file, or the like.

At 618, the segment generation module may generate a video segment using the video frames associated with the index (I) that were annotated by the annotation module.

At 620, in some examples, the segment generation module may store the video segment in the storage, such as in the file store 142 discussed above with respect to FIG. 1. For instance, the play out buffer 132 may be capable of buffering more frames than the above mentioned threshold t. If the play our buffer 132 has enough buffering size (i.e., larger than the threshold t), segment or segments related to a particular indexed profile may be generated and saved in file storage 142 discussed above with respect to FIG. 1.

At 622, alternatively, if the index (1) is not associated with a higher priority in the priority definition 210 (e.g., does not exceed a threshold level of priority), the annotation module may check the system definition for available system resources. For instance, via the annotation management module 218 discussed above with respect to FIG. 2, the annotation module may determine the available system resources from the system definition 208. In some examples, the threshold priority level value may vary according to the resources available in the system, e.g., as determined from the system definition 208, while in other examples, the threshold priority level may be a fixed value according to a particular system or a user preference.

At 624, the annotation module determines whether sufficient system resources are available. For instance, in situations in which the video analysis system demands more computational resources, the resource management module 110 may limit the annotation tasks associated with lower priority indexed profiles, such as those that have only appeared recently in the IASH log 402.

At 626, if the annotation module and/or the resource management module determine that sufficient system resources are not available, the annotation module does not annotate the set of frames, and therefore the segment generation module does not generate a video segment. On the other hand, if sufficient resources are available, the process may go to 614 to proceed with annotation of the set of frames and generation of the video segment as discussed above at 614-620.

Figure 7:
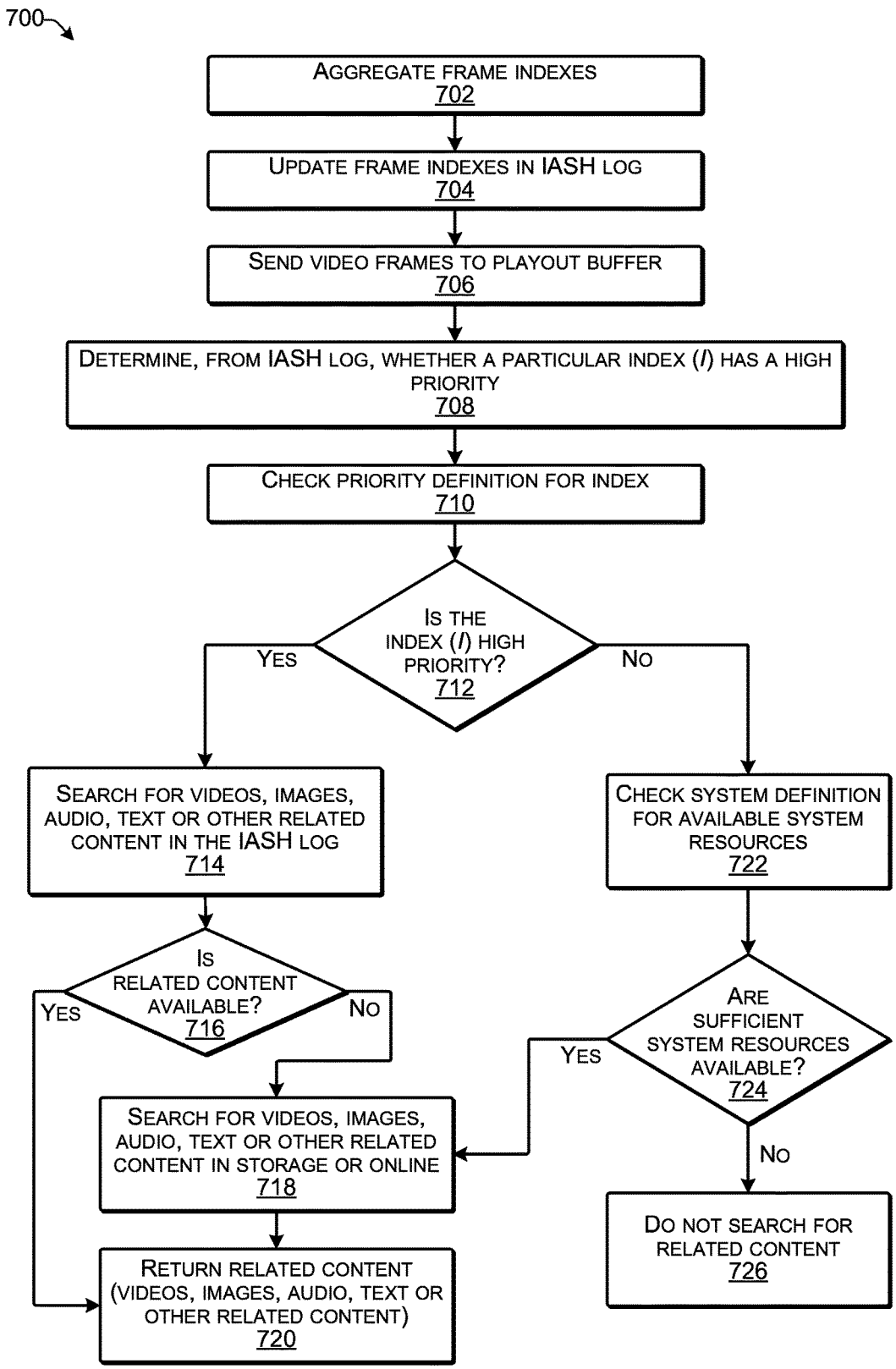
FIG. 7 is a flow diagram illustrating an example process for searching for related content according to some implementations

FIG. 7 is a flow diagram illustrating an example process 700 for searching for related content according to some implementations. In some cases, the process 700 may be performed by prefetching related content 144, at least in part, after the relevant frames are stored in the play out buffer 132. Since the video frames are indexed and annotated prior to play out, there may be sufficient time to perform these and/or other operations prior to play out 134. Prefetching related content may be also performed when the indexing is performed by the indexing module. After a particular region or frame is indexed, the related contents can be prefetched and updated in the IASH log 402. After a particular video frame is in the indexing buffer, such related contents can be associated with that particular video frame. Further, related contents prefetching may also be carried out according to the priority definition, such that related content may be prefetched for frames corresponding to higher priority indexes, and not for frames corresponding to lower priority indexes. The process 700 may be performed at least in part by the related content search module 428 executing on at least one computing device in a video analysis system.

At 702, the indexing module may compare index information for a plurality of recent frames. For instance, a video segment may include a set of video frames that are related in some manner and such relations may be indicated by the indexed profile identifying information "index (1)" associated with each frame. Accordingly, the indexing module may initially identify frames that are related based on a comparison of the index information associated with the video frames, e.g., each frame may have one or more indexed regions that may be related to indexed regions of other frames.

At 704, the indexing module may add the index information determined from aggregating and comparing the index information associated with the plurality of frames to the IASH log for each corresponding video frame.

At 706, the indexing module may store the video frames in the playout buffer.

At 708, the related content search module may determine from the IASH log 402 whether a particular index (I) associated with a video frame is associated with a higher priority. For example, the related content search module may refer to the priority definition 210 maintained by the resource management module 110 for determining a priority associated with the particular video frame.

At 710, the related content search module may check the priority definition associated with the particular index (I). For example, a related content search may use significant computational resources. Accordingly, the priority for searching for related content may be based on a priority of a particular category, a priority of particular index, or may be a function of both of these priorities, depending on how a particular user sets up the system and/or based on user input. The related content search priority may be determined using any suitable mathematical or logical function, with one non-limiting example being as follows: related content search priority=(category priority)$^2$×index priority. As another example, suppose that a particular recognition task is configured to recognize costumes. For instance, the recognized video frames or video segments may be used for marketing related advertisements. In such as case, a high priority may be assigned to the costume recognition task. In another example, a high priority may be assigned to recognition tasks for popular actors, celebrities, or the like. In the automatic priority definition setting, the priority may be decided based in part on priorities associated with particular categories.

At 712, the related content search module may determine whether the index (I) is associated with a higher priority. For example, there may be a threshold priority level established for the search for related content for a frame associated with a particular indexed profile to proceed. If the priority level associated with the index (I) is not higher than the threshold priority level, then the process goes to block 722. In some examples, the threshold priority level value may vary according to the resources available in the system, e.g., as determined from the system definition 208, while in other examples, the threshold priority level may be a fixed value according to a particular system or a user preference.

At 714, if the index (I) is associated with a higher priority, the related content search module may search for clips, videos or other related content in the IASH log 402. For example, as discussed above, the module may search the IASH log for an entry associated with the same index (I), and for which related content has already been retrieved.

At 716, the related content search module may determine whether related content is available in the IASH log.

At 718, if the related content is not available from searching the IASH log, the module may search for clips, video or other related content in the storage 118.

At 720, if related content is located in either the IASH log, or in the storage 118, the related content search module may return the located related content, such as to enable presentation of the related content during play out of the associated video frame.

At 722, on the other hand, if the index (1) is not associated with a high priority, the module may check the system definition for available system resources. For instance, from the resource management module 110, the related content search module may determine the available system resources from the system definition 208.

At 724, the related content search module may determine whether sufficient system resources are available. For instance, in situations in which the video analysis system demands more computational resources, the resource management module 110 may limit the search and retrieval tasks associated with lower priority indexed profiles, such as those tasks that have only appeared recently in the IASH log 402. In some examples, lower priority tasks may be skipped temporarily until more system resources are available, e.g., as determined from checking the system definition.

At 726, if the related content search module and/or the resource management module 110 determine that sufficient system resources are not available, the related content search module may not search for related content. On the other hand, if sufficient resources are available, the process may go to 714 to proceed with searching for related content as discussed above at 714-720.

Figure 8:
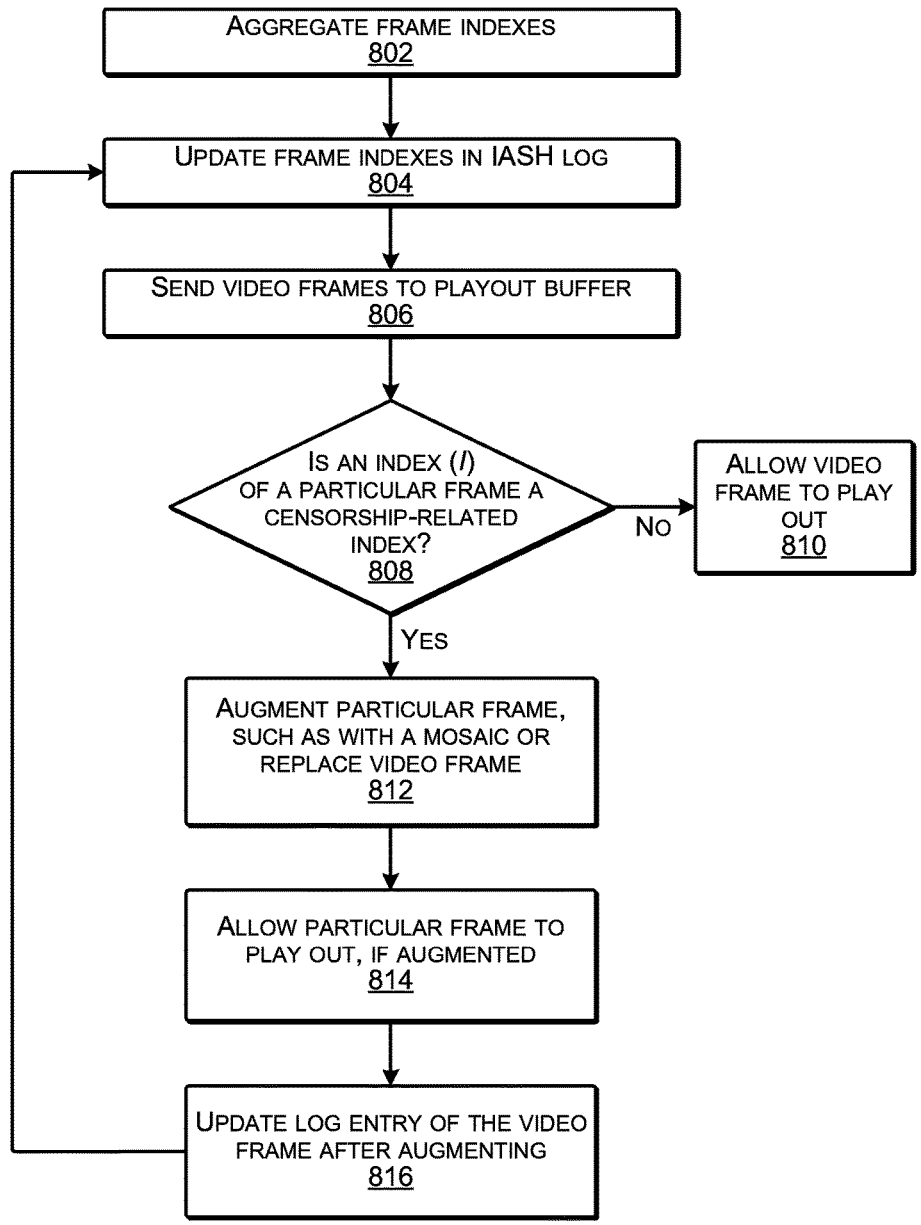
FIG. 8 is a flow diagram illustrating an example process for determining whether to censor a portion of a video frame according to some implementations.

FIG. 8 is a flow diagram illustrating an example process 800 for determining whether to censor a portion of a video frame according to some implementations. In some examples, the censorship module 424 discussed above with respect to FIG. 4 may perform censorship management on the video frames stored in the play out buffer 132. For instance, the frames in the play out buffer 132 may have already been indexed by associating textual, numerical and/or visual meanings with the respective frames. Hence, there still may be sufficient time prior to play out to perform operations such as censorship management. As another example, censorship detection/triggering may be performed by the indexing module 128. For instance, during the indexing process, the indexing module may detect material to be censored, and may add a mosaic to a corresponding frame in the play out buffer, or may trigger the censorship module to perform this action on a specified region of a specified frame.

At 802, the indexing module may aggregate or otherwise compare a plurality of recent frame indexes. For instance, a video segment may include a set of video frames that are related in some manner and such relations may be indicated by the index information associated with each frame. Accordingly, the indexing module may initially identify frames that are related based on a comparison of the index information associated with the video frames, e.g., each frame may have one or more indexed regions that may be related to indexed regions of other frames.

At 804, the indexing module may add the index information determined from aggregating and comparing the index information associated with the plurality of frames to the IASH log for each corresponding video frame.

At 806, the indexing module may store the video frames in the play out buffer.

At 808, the censorship module may determine whether an index (I) associated with a particular frame is a censorship-related indexed profile. Examples of censorship-related indexed profiles may include index profiles including images containing nudity, sex acts, extreme violence, and the like.

At 810, if the censorship module determines that the index (I) associated with the particular frame is not a censorship-related indexed profile, the censorship module may allow the particular video frame to proceed to play out.

At 812, on the other hand, if the censorship module determines that the index (I) associated with the particular frame is a censorship-related indexed profile, the censorship module may augment the particular frame, such as by adding a mosaic over a portion to be censored. Alternatively, the censorship module may delete or replace the video frame.

At 814, the censorship module may allow the particular video frame to play out. For example, after the particular video frame has been augmented with a mosaic, the censorship module may allow the particular video frame to play out. Alternatively, if the particular frame is replaced, the replacement frame may be allowed to play out.

At 816, the censorship module may update the log entry of the video frame in the IASH log to indicate that the video frame has been augmented. Furthermore, while the above process 800 describes augmenting a particular frame for censorship purposes, augmenting of other video frames for other purposes such as advertisement, marketing, explanation, increasing user comprehension, and so forth, may be performed in a similar manner.

Figure 9:
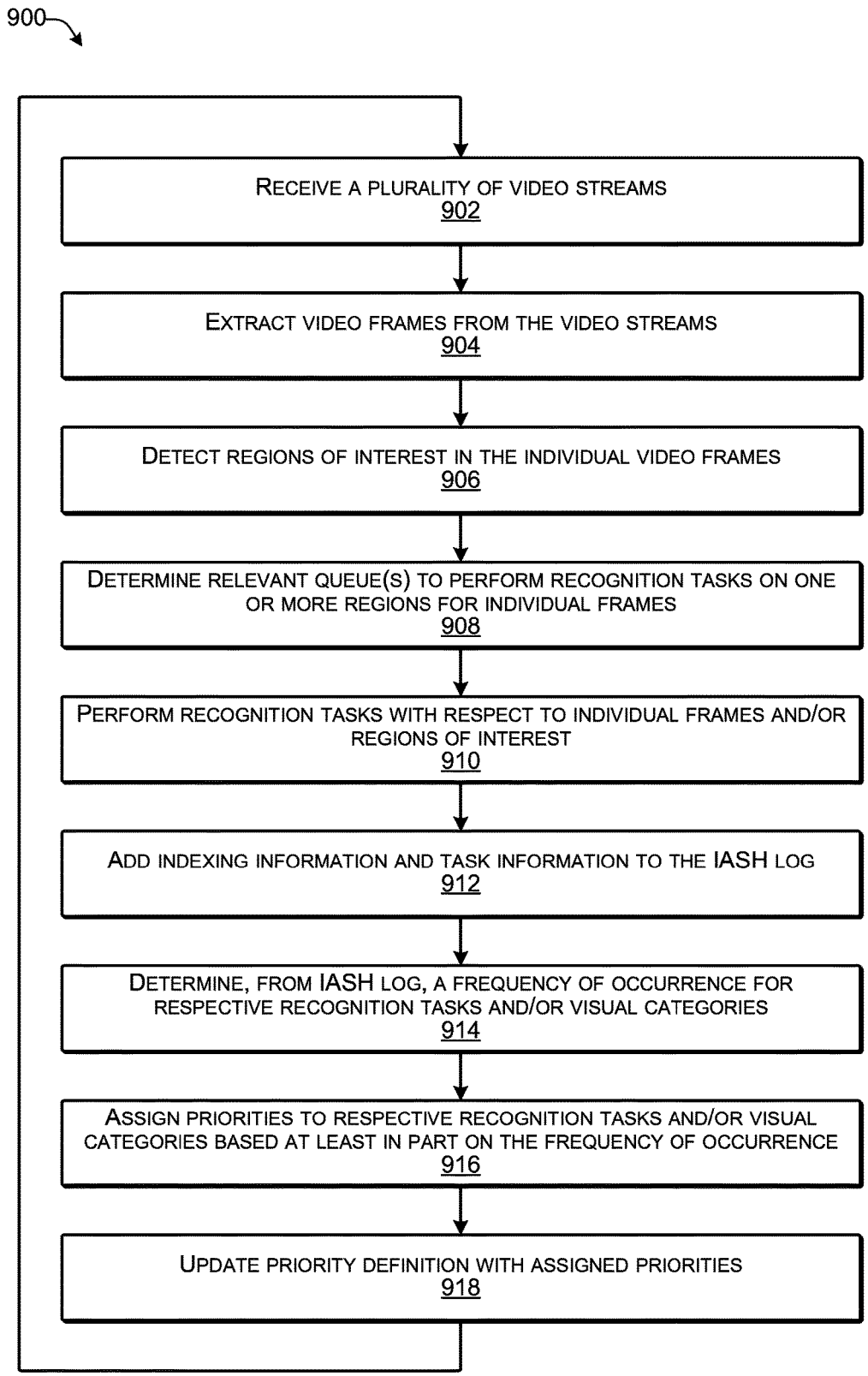
FIG. 9 is a flow diagram illustrating an example process for determining a priority definition according to some implementations.

FIG. 9 is a flow diagram illustrating an example process 900 for dynamically establishing a priority definition for various video analysis tasks according to some implementations. In some cases, a portion of the process 900 may be performed by the priority determination module 212 executing on at least one computing device in a video analysis system.

At 902, the computing device may receive a plurality of video streams. For example, as discussed above with respect to FIG. 1, a plurality of video streams may be received into a receiving buffer.

At 904, the computing device may extract video frames from the received video streams. For example, the computing device may identify a plurality of video frames corresponding to each video stream.

At 906, the computing device may detect regions of interest associated with individual video frames. For instance, a region detection module may identify one or more regions of interest in an image associated with an individual video frame.

At 908, the computing device may determine a relevant pipeline queue corresponding to at least one detected region of interest. For example, the individual pipelines may be designated for processing video analysis tasks for particular visual categories such as facial recognition, object recognition, location recognition, motion recognition, and so forth. Accordingly, based on the detected region of interest in a particular video frame, the computing device may determine to which pipeline to send the particular video frame, or at least the region of interest.

At 910, the computing device may perform video analysis tasks with respect to individual frames and/or individual detected regions of interest. For instance, the assigned pipeline may perform video analysis and may match the detected region with an indexed profile.

At 912, the computing device may add indexing information and/or task information to the IASH log. For example, if the assigned pipeline performed facial recognition, the visual category may be recorded in an entry associated with the particular video frame in the IASH log (not shown in the example IASH log 402 of FIG. 4). Additionally, or alternatively, the matched indexed profile may indicate the visual category, and an indexed profile identifier of the matched indexed profile may be recorded in the IASH log.

At 914, the priority determination module may determine, from the IASH log, a frequency of occurrence of respective video analysis tasks and/or visual categories for entries present in the IASH log.

At 916, the priority determination module may assign priorities to respective video analysis tasks and/or visual categories based at least in part on the frequency of occurrence of the respective tasks and/or visual categories. For example, if logo detection is the most frequently occurring task, then that task may be given the highest priority; if facial recognition is next most frequently occurring task, then that task may be given the second highest priority, and so forth. Through this automatic priority detection and assignment, pipeline resources may be effectively allocated among the video analysis tasks. For instance, more logos detected in the video stream(s) leads to more resources being allocated to a logo recognition video analysis task, while fewer faces detected in the video analysis stream may lead to fewer resources being allocated to the facial recognition video analysis task. This can enable balanced indexing, i.e., indexing may be focused with a priority toward context of a particular video stream or streams. Further, in some examples, constraints may be applied so that the priority determination module might not assign priorities purely on frequency of occurrence of different visual categories. For example, certain users or applications may assign priorities to certain tasks, such as based on past experience, expected frequency of video analysis tasks for certain genres of video streams, or various other considerations. Further, the assignment of priorities may be weighted for different applications or different genres of video streams. For example, when processing sports videos, there may be a higher weighting on giving priority to a video analysis task for recognizing an object, such as a ball, while in a news video, there may be higher weighting on giving higher priority to recognizing faces.

At 918, the priority determination module may update the priority definition with the assigned priorities. For example, the priority definition 210 may be an XML file or other suitable file or data structure that may be changed to indicate the currently assigned priorities for particular respective video analysis tasks and/or visual categories. Further, the process 900 may be repeated indefinitely, and the priority definition 210 may be periodically updated based on the video streams recently received. The changes in the priority definition 210 may be performed directly, e.g., based on a percentage corresponding to respective frequencies of occurrence, or may be performed based on a mathematical formula or other functions to avoid sudden fluctuations in operation of the pipelines and other tasks in the system. Further, weightings may be applied, as mentioned above.

Figure 10:
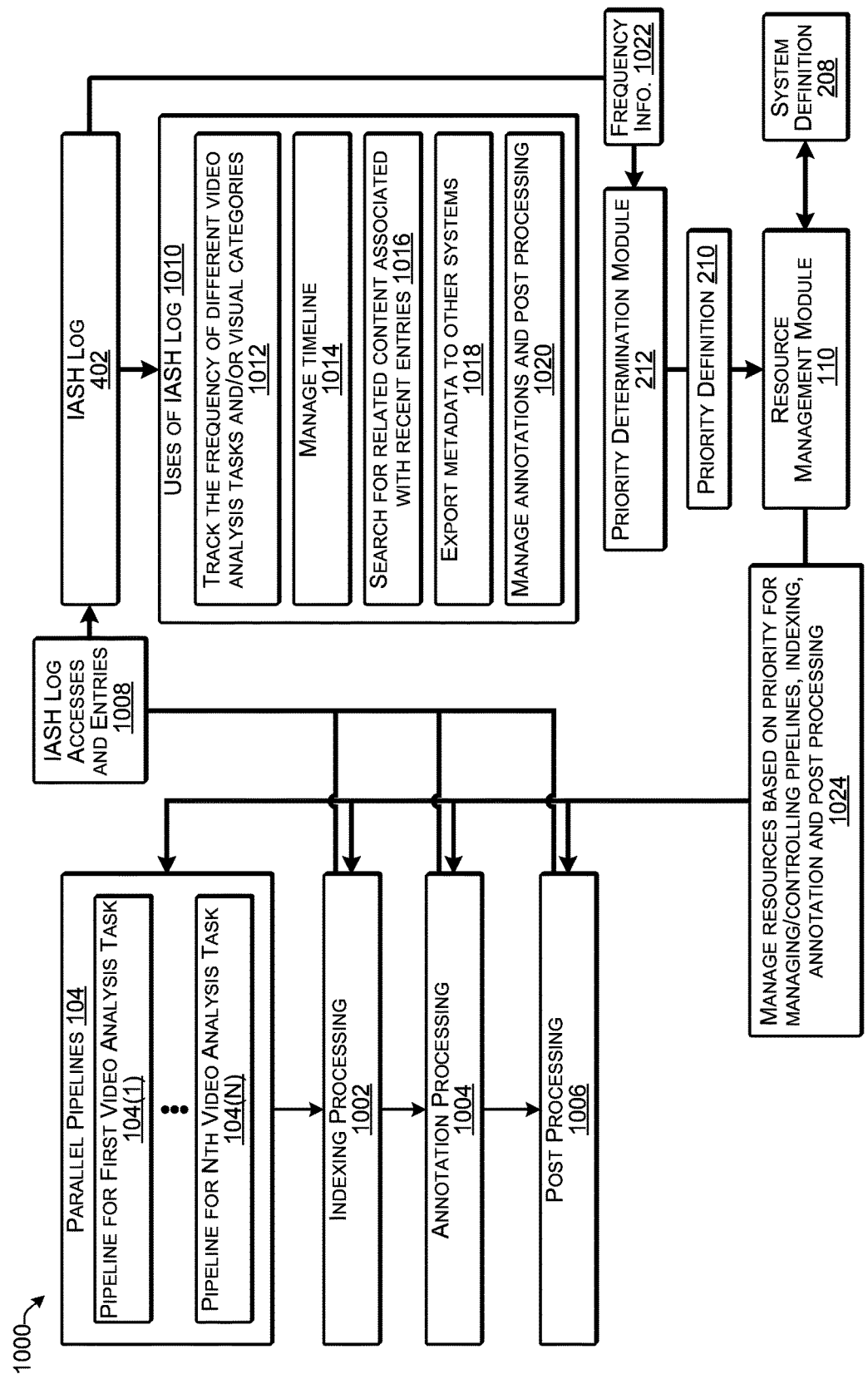
FIG. 10 is a conceptual block diagram illustrating use of a log data structure to determine priorities for managing resources according to some implementations.

FIG. 10 is a conceptual block diagram 1000 illustrating use of the IASH log 402 to determine priorities for managing resources according to some implementations. In this example, priorities can be assigned to particular types of video analysis tasks corresponding to different visual categories, and/or to individual indexes, textures, or the like. As discussed above, a plurality of parallel pipelines 104 may include a first pipeline 104(1) configured to perform a first video analysis task and an Nth pipeline 104(N) configured to perform an Nth video analysis task. The results of these video analysis tasks may be provided for indexing processing 1002, annotation processing 1004, and/or post processing 1006, as discussed above. As indicated at 1008, some or all of these processing operations 1002-1006 may result in accesses to the IASH log 402 and/or entries to the IASH log 402.

As indicated at 1010, the information maintained in the IASH log 402 may be employed for a number of different uses. For instance, as indicated at 1012, the information in the IASH log 402 may be used to track the frequency of different video analysis tasks and/or visual categories of recently indexed video frames or regions, such as based on video analysis of features extracted from the frames or regions. Furthermore, as indicated at 1014, the IASH log 402 may be used to manage the timeline of the video processing system such as for ensuring that video frames are available for play out in the play out buffer according to a desired time frame, such as for real time processing of the video streams. As one example, the timeline may be managed by skipping certain lower priority tasks, such as lower priority indexing tasks, annotation tasks or the like to ensure that a desired timeline is maintained.

Additionally, as indicated at 1016, the IASH log 402 may be used to search for related content associated with recent entries. For instance, rather than searching for related content in a database, online, or the like, the post processing module may search the IASH log 402 to locate any related content that may have already been retrieved for a similarly indexed video frame or region of a video frame. Accordingly, this can enable fast retrieval of related content during real time processing of video streams. Furthermore, as indicated at 1018, the IASH log 402, or at least a portion of the information maintained in the IASH log 402, may be exported as metadata to other systems, such as for broadcast video systems or the like. In addition, as indicated at 1020, the IASH log 402 may be used to manage annotations and post processing in relation to video frames and/or regions of the video frames. For instance, as mentioned above, video segments may be identified based on the information in the IASH log 402. Furthermore, censorship, augmentation, and other post processing may be performed on video frames based on the information maintained in the IASH log 402.

The priority determination module 212 may automatically define, update or otherwise determine the priority definition 210 for the system based on frequency information 1022 obtained from the IASH log 402. For instance, the priority determination module 212 may use the frequency information 1022 from the IASH log 402 to determine the priority definition 210 based on a frequency of occurrence of different visual categories and/or associated video analysis tasks, as indicated in the entries of the IASH log 402. Furthermore, as indicated at 1024, the resource management module 110 may use the priority definition 210 and the system definition 208 to manage system resources, such as computational resources, based on the priority definition 210 for managing and otherwise controlling the pipelines 102, the indexing processing 1002, the annotation processing 1004, and the post processing 1006, as discussed above.

The priority definition 210 becomes useful when the system demands increase and computational resources become scarce within the system. Such a case, the priority definition 210 may be used by the resource management module 110 or submodules thereof in the following ways. With respect to a region detection tasks, the category management module of the resource management module 110 may temporarily stop performing low priority region detection tasks. With respect to video analysis task performed by the pipelines 104, the pipeline management module of the resource management module 110 may change the pipeline processing of the video analysis task according to the priority definition 210. For instance, the pipeline management module may discard a pipeline completely; may allocate more pipelines for high priority video analysis tasks; may allocate more processing capacity, memory capacity and/or other computational resources to particular pipelines performing higher priority analysis task; and/or may discard lower priority tasks in particular pipeline queues.

With respect to indexing tasks, the indexing management module of the resource management module 110 may skip indexing of certain low priority categories for specific low priority indexes. Additionally, the indexing management module may allocate more or less computational resources for a particular indexing task based on the priority definition 210. Furthermore, with respect to annotation tasks, the annotation management module of the resource management module 110 may skip annotation for certain low priority categories or for specific low priority indexes. In addition, the annotation management module may allocate more or fewer computational resources for a particular annotation passed based on the priority definition 210. Additionally, with respect to post processing operations, the post processing module(s) and/or the resource management module 110 may skip post processing tasks for certain low priority categories and/or specific low priority indexes. Additionally, more or less resources may be allocated for a particular post processing tasks based on the priority definition 210. As one example, with respect to related content search, related content searches might only be performed for higher priority indexes or visual categories, and might not be performed for lower priority indexes or visual categories.

Figure 11:
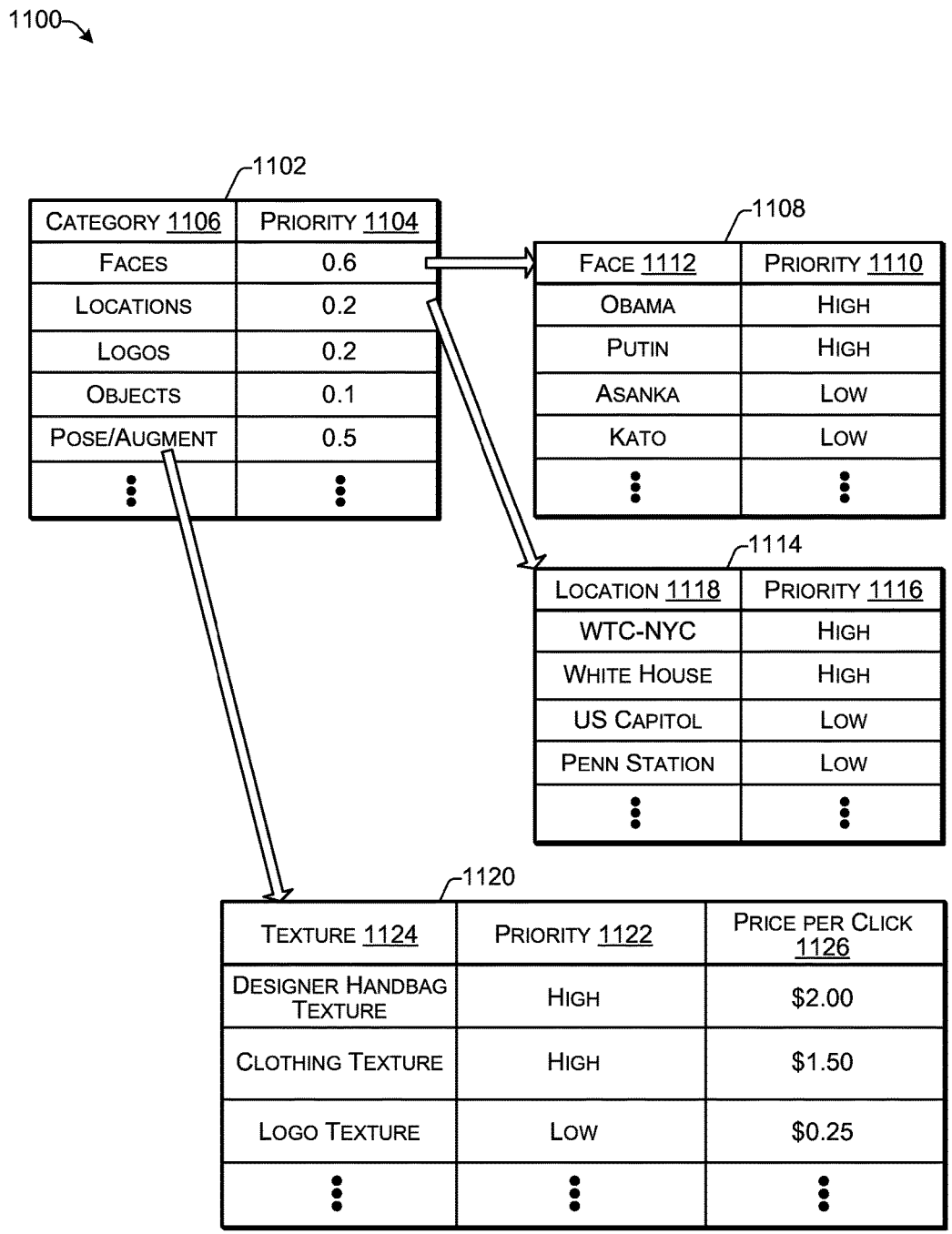
FIG. 11 illustrates an example of one or more priority definition data structures according to some implementations.

FIG. 11 illustrates an example of one or more priority definition data structures 1100 according to some implementations. The priority definition data structures 110 may be used to define, at least in part, the priority definition 210 (not shown in FIG. 11). The priorities for various different categories can be defined in terms of numerical values or qualitative indicators (e.g., high, medium, low). Further, in some cases, the qualitative indicators may be associated with numerical values, such as high=0.75, medium=0.5, low=0.25, and so on. Depending on the system configuration, the priority associated with the visual category, the priority associated with an individual index, or combination of both types of priorities may be used for managing system operations and/or resources. As mentioned above, priorities can be set manually, such as by a user or application, can be set automatically by the priority determination module, or may be set by a combination of both. Automatic priority may be determined based at least in part on the recent indexing history, such as based on a frequency of occurrence of various different visual categories, particular indexes, or the like. As one example, when the system is initialized, a set of pipelines to be used may be assigned equal priorities. As the system processing video streams, the priorities may be changed dynamically by the priority determination module to accommodate the content or other contexts of the video streams being processed. For instance, the priority determination module may access the IASH log to determine from recent indexing history the frequency of occurrence of each visual category. In automatic setting, the priority determination module may update the priority associated with each visual category (or the corresponding video analysis task), such as based on a formula that may take into consideration existing priority and the frequency of occurrence of each visual category. The priority definition itself may be maintained as a text file, a database, an XML file, in the IASH log, or via any other suitable data structure or data structures.

In the illustrated example, a first priority table 1102 indicates priorities 1104 associated with different visual categories 1106. Examples of the visual categories 1106 in this example include faces, e.g., corresponding to a facial recognition video analysis task; locations, e.g., corresponding to a location recognition video analysis task; logos, e.g., corresponding to a logo recognition video analysis task; objects, e.g., corresponding to an object recognition video analysis task; pose/augmentation, e.g. corresponding to a pose recognition video analysis task associated with augmentation of a video frame; and so forth. The priorities 1104 in the first priority table 1102 are assigned in numerical values, with faces having the highest priority in this example, but as discussed above, may alternatively be assigned qualitative values.

Furthermore, a second priority table 1108 may define priorities 1110 for particular indexes corresponding to the face category 1112. Examples of the particular indexes include Obama and Putin, which are associated with high priorities, and Asanka and Kato, which are associated with low priorities. Similarly, a third priority table 1114 may define priorities 1116 for particular indexes corresponding to the location category 1118. Examples of the particular indexes include the World Trade Center in New York City and the White House, which are associated with high priorities, and the US Capitol and Penn Station, which are associated with low priorities. Additionally, a third priority table 1120 may define priorities 1122 for particular textures 1124 that may be recognized by the pose recognition video analysis task. For instance, a designer handbag tester and a clothing texture may be associated with high priorities, while a logo texture is associated with a low priority. Further, in this example, the priorities 1122 may be controlled at least in part based on a price per click 1126. For instance, since a service may be paid more for the high priority indexes than for the low priority index, the priorities for the designer handbag and clothing indexes may remain high, even if their frequency of occurrence is lower than that of the low priority index (i.e., the logo texture in this example). Furthermore, while several examples of priority definition techniques have been described herein, numerous variations will be apparent to those of skill in the art having the benefit of the disclosure herein.

Figure 12:
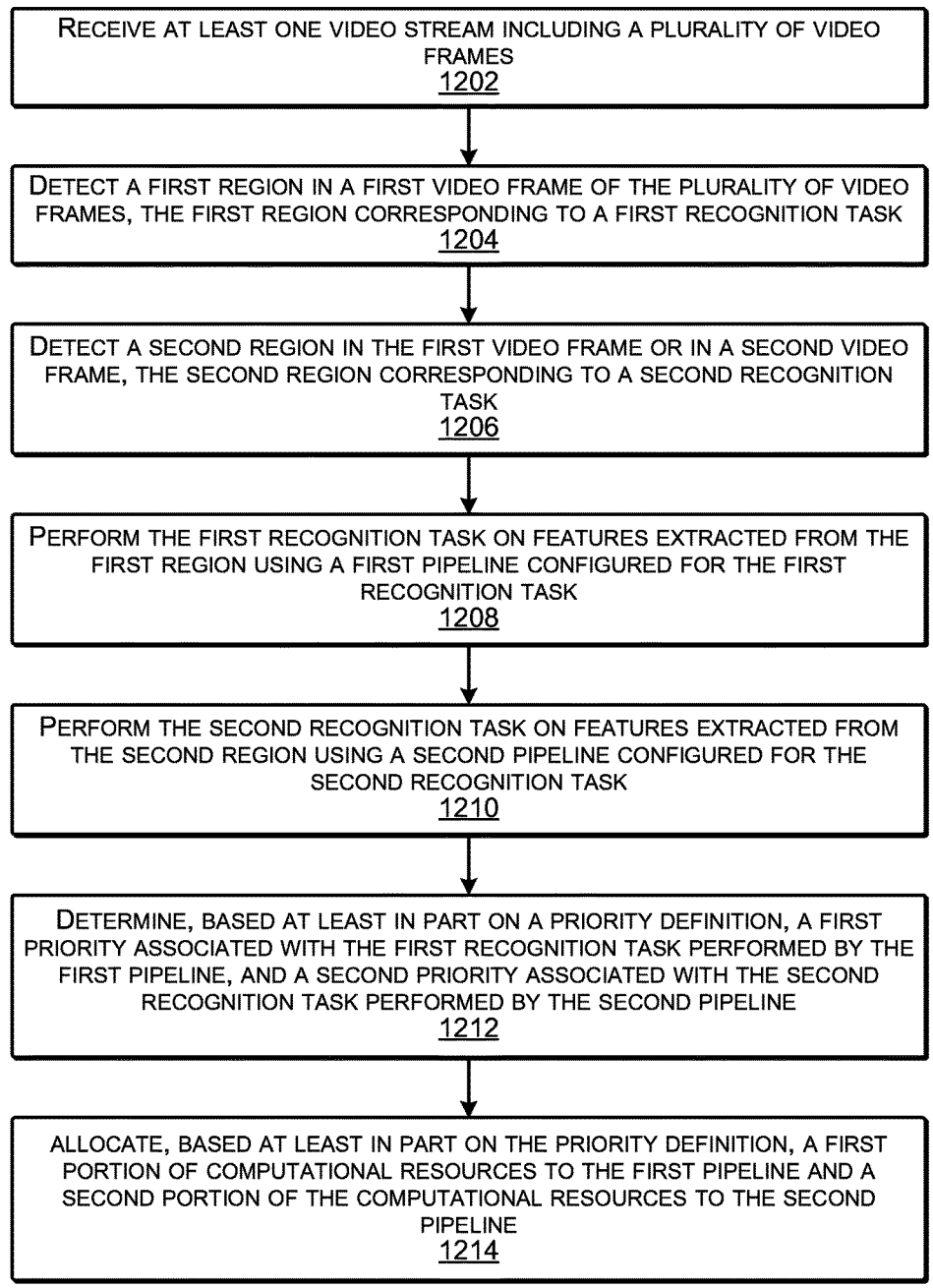
FIG. 12 is a flow diagram illustrating an example process for pipeline processing of one or more video streams according to some implementations.

FIG. 12 is a flow diagram illustrating an example process 1200 for processing video streams using a plurality of task-dedicated pipelines according to some implementations. In some cases, the process 1200 may be performed by at least one computing device in a video analysis system.

At 1202, the computing device receives at least one video stream including a plurality of video frames. For instance, the computing device may receive a plurality of video streams, each including a plurality of video frames.

At 1204, the computing device may detect a first region in a first video frame of the plurality of video frames. The first region may correspond to a first video analysis task (e.g., facial recognition, object recognition, etc., as enumerated elsewhere in this disclosure). For example, the computing device may perform region detection using techniques known in the art.

At 1206, the computing device may detect a second region in the first video frame or in a second video frame of the plurality of video frames. The second region may correspond to a second video analysis task.

At 1208, the computing device may perform the first video analysis task on features extracted from the first region using a first pipeline configured for the first video analysis task. For example, the first pipeline may be dedicated for a first type or category of video analysis task, such as facial recognition, object recognition, logo recognition, scene recognition, etc., as enumerated elsewhere herein. As one example, the computing device may compare the features of the first region with one or more images associated with the indexed profiles to attempt to locate a match within a threshold level of confidence. As another example, the computing device may utilize an intelligent computational algorithm to attempt to locate a corresponding indexed profile. Other variations will be apparent to those of skill in the art having the benefit of the disclosure herein.

At 1210, the computing device may perform the second video analysis task on features extracted from the second region using a second pipeline configured for the second video analysis task. Thus, the second pipeline may be dedicated for the second video analysis task.

At 1212, the computing device may determine, based at least in part on a priority definition, a first priority associated with the first video analysis task performed by the first pipeline, and a second priority associated with the second video analysis task performed by the second pipeline. As one example, the resource management module 110 may maintain the priority definition that indicates relative priorities for the respective video analysis tasks.

At 1214, the computing device may allocate, based at least in part on the priority definition, a first portion of computational resources to the first pipeline and a second portion of the computational resources to the second pipeline. For instance, a pipeline performing a higher priority task may be allocated a larger portion of computational resources of the computing system, such as processing resources, memory, storage, communication interfaces, and the like. As discussed above, should the queue of a pipeline performing the higher priority task become full or appear likely to become full, the resource management module may reallocate computational resources based at least in part on the priority definition.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 13:
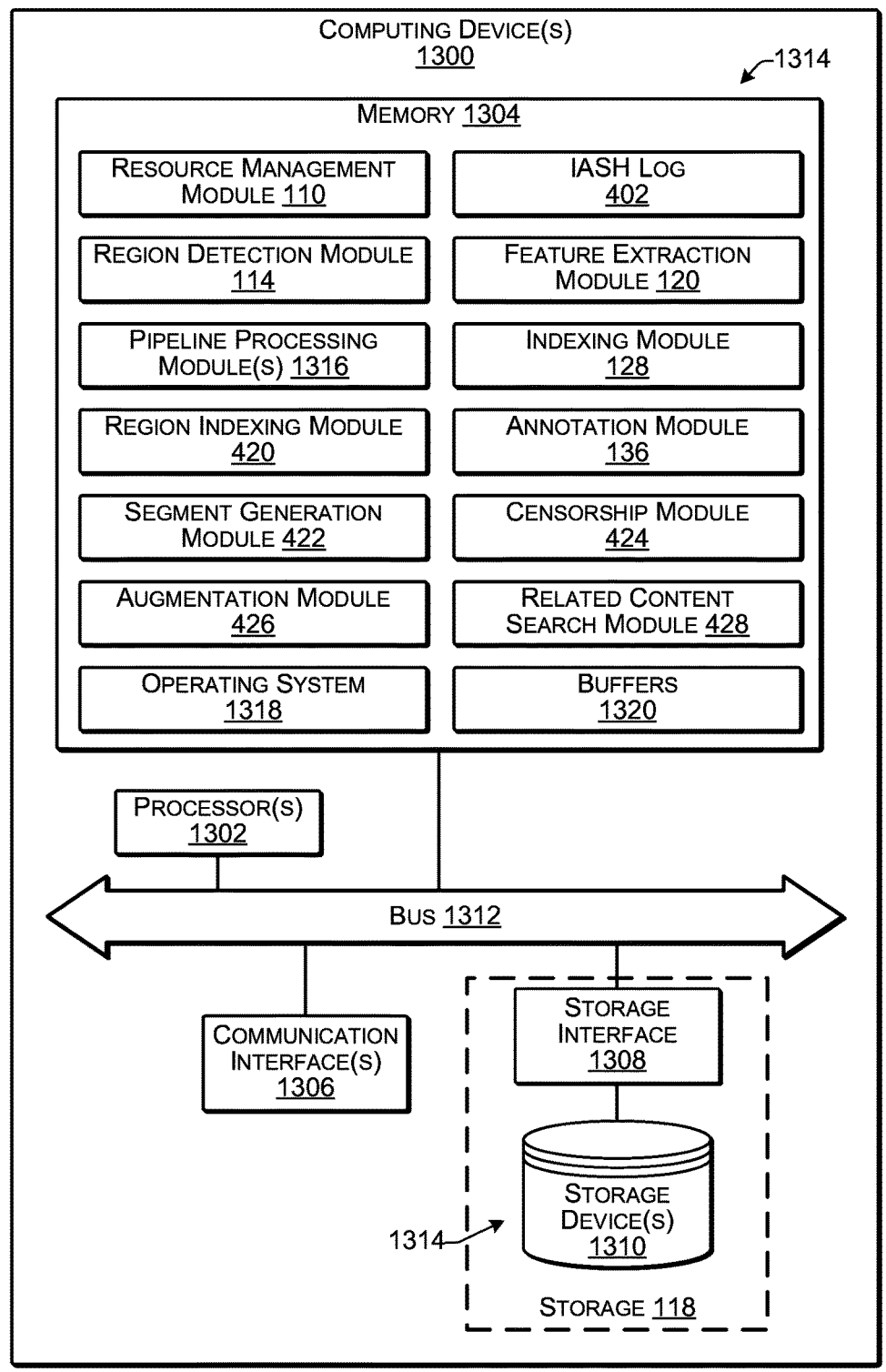
FIG. 13 illustrates select components of one or more example computing devices according to some implementations.

FIG. 13 illustrates select components of an example computing device 1300 configured for video analysis according to some implementations. In some examples, the computing device 1300 may include one or more servers or other types of computing devices that may be embodied in any number of ways. For instance, in the case of a server, the modules, other functional components, and data storage may be implemented on a single server, a cluster of servers, a server farm or data center, a cloud-hosted computing service, and so forth, although other computer architectures may additionally or alternatively be used. In the illustrated example, the computing device 1300 may include, or may have associated therewith, one or more processors 1302, a memory 1304, one or more communication interfaces 1306, a storage interface 1308, one or more storage devices 1310, and a bus 1312.

Each processor 1302 may be a single processing unit or a number of processing units, and may include single or multiple computing units or multiple processing cores. The processor(s) 1302 can be implemented as one or more central processing units, microprocessors, microcomputers, microcontrollers, digital signal processors, state machines, logic circuitries, and/or any devices that manipulate signals based on operational instructions. For instance, the processor(s) 1302 may be one or more hardware processors and/or logic circuits of any suitable type specifically programmed or configured to execute the algorithms and processes described herein. The processor(s) 1302 can be configured to fetch and execute computer-readable instructions stored in the memory 1304, which can program the processor(s) 1302 to perform the functions described herein. Data communicated among the processor(s) 1302 and the other illustrated components may be transferred via the bus 1312 or other suitable connection.

In some cases, the storage device(s) 1310 may be at the same location as the computing device 1300, while in other examples, the storage device(s) 1310 may be remote from the computing device 1300, such as accessible via one or more networks. The storage interface 1308 may provide raw data storage and read/write access to the storage device(s) 1310.

The memory 1304 and storage device(s) 1310 are examples of computer-readable media 1314. Such computer-readable media 1314 may include volatile and non-volatile memory and/or removable and non-removable media implemented in any type of technology for storage of information, such as computer-readable instructions, data structures, program modules, or other data. For example, the computer-readable media 1314 may include, but is not limited to, RAM, ROM, EEPROM, flash memory or other memory technology, optical storage, solid state storage, magnetic tape storage, magnetic disk storage, RAID storage systems, storage arrays, network attached storage, storage area networks, cloud storage, or any other medium that can be used to store the desired information and that can be accessed by a computing device. Depending on the configuration of the computing device 1300, the computer-readable media 1314 may be a type of computer-readable storage media and/or may be a tangible non-transitory media to the extent that when mentioned, non-transitory computer-readable media exclude media such as energy, carrier signals, electromagnetic waves, and/or signals per se.

The computer-readable media 1314 may be used to store any number of functional components that are executable by the processor(s) 1302. In many implementations, these functional components comprise instructions or programs that are executable by the processor(s) 1302 and that, when executed, specifically configure the processor(s) 1302 to perform the actions attributed herein to the computing device 1300. Functional components stored in the computer-readable media 1314 may include the resource management module 110, the region detection module 114, the feature extraction module 130, the indexing module 138, the region indexing module 420, the annotation module 136, the segment generation module 422, the censorship module 424, the augmentation module 426, the related content search module 428, and a plurality of pipeline processing modules 1316, which may perform the video analysis, index matching, and other pipeline processing functions discussed above. Each of the above-mentioned modules may be computer programs, or portions thereof. As one example, these modules may be stored in the storage device(s) 1310, loaded from the storage device(s) 1310 into the memory 1304, and executed by the one or more processors 1302. Additional functional components stored in the computer-readable media 1304 may include an operating system 1318 for controlling and managing various functions of the computing device 1300.

In addition, the computer-readable media 1304 may store data and data structures used for performing the functions and services described herein. Thus, the computer-readable media 1314 may store the IASH log 402. Further, the memory 1304 may include designated regions to serve as buffers 1320, such as for buffers 112, 130, 132, as well as pipeline queues 106. Additionally, the storage 118 may include the database 136, file store 142, and the related content 144, and other data discussed above (not shown in FIG. 13). The computing device 1300 may also include or maintain other functional components and data, which may include programs, drivers, etc., and the data used or generated by the functional components. Further, the computing device 1300 may include many other logical, programmatic and physical components, of which those described above are merely examples that are related to the discussion herein.

The communication interface(s) 1306 may include one or more interfaces and hardware components for enabling communication with various other devices, such as over one or more networks. For example, communication interface(s) 1306 may enable communication through one or more of a LAN, the Internet, cable networks, cellular networks, wireless networks (e.g., Wi-Fi) and wired networks, direct connections, as well as close-range communications such as BLUETOOTH®, and the like, as additionally enumerated elsewhere herein.

Further, while FIG. 13 illustrates the components and data of the computing device 1300 as being present in a single location, these components and data may alternatively be distributed across different computing devices and different locations in any manner. Consequently, the functions may be implemented by one or more computing devices, with the various functionality described above distributed in various ways across the different computing devices. The described functionality may be provided by the servers of a single entity or enterprise, or may be provided by the servers and/or services of multiple different enterprises. Further, while in some cases, the computing device 1300 may be a single computing device that receives video streams and delivers play out via a direct connection or local network connection to a video consumer, in other examples, the computing device 1300 may be part of a larger video processing system such as that discussed below with respect to FIG. 13.

Figure 14:
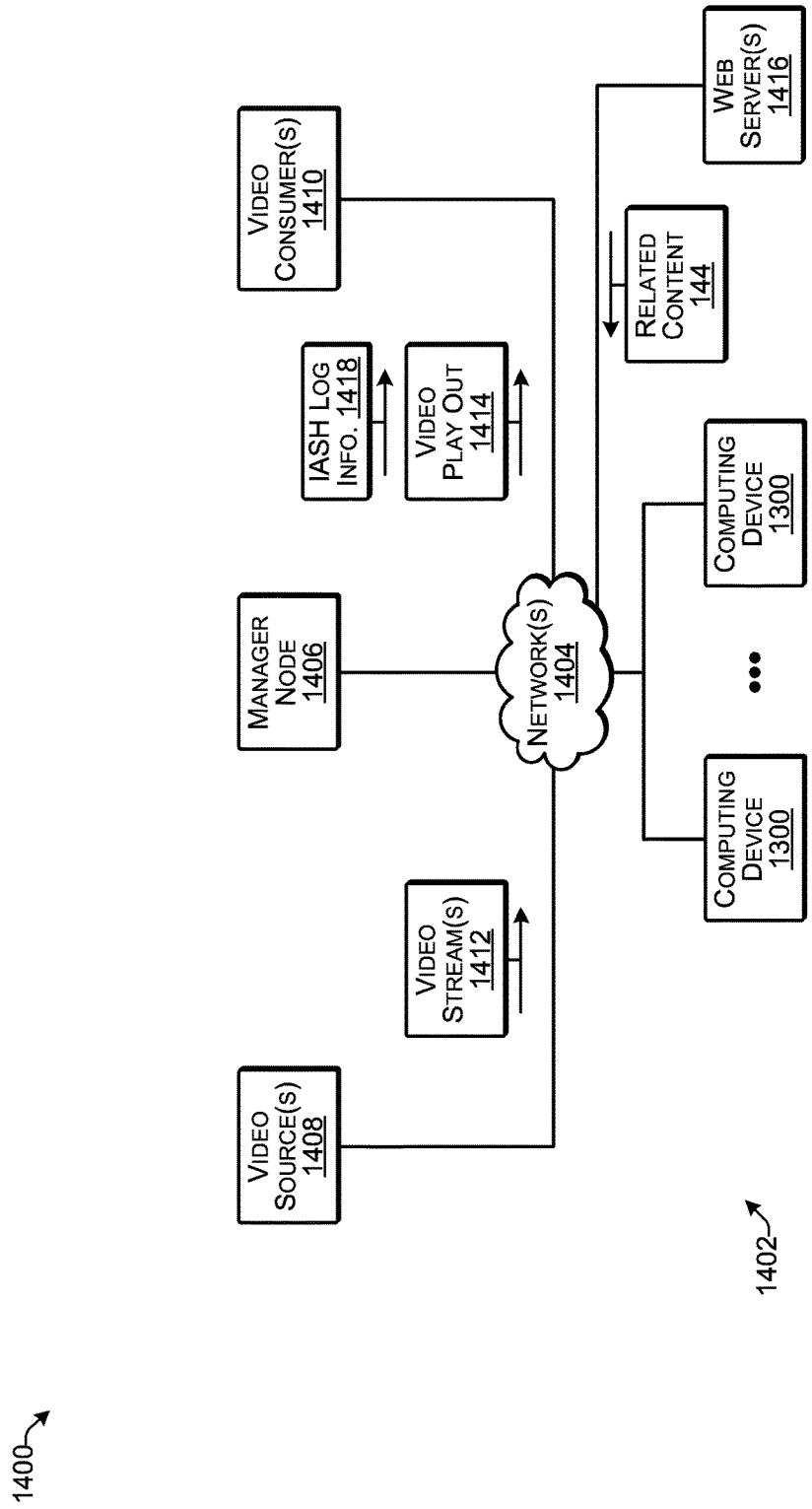
FIG. 14 illustrates an example system architecture for video processing according to some implementations.

FIG. 14 illustrates an example architecture of a system 1400 according to some implementations. The system 1400 includes a plurality of computing devices 1402 able to communicate with each other over one or more networks 1404. The computing devices 1402 include one or more of the computing devices 1300 discussed above with respect to FIG. 13 connected to the one or more networks 1404. Further, the system 1400 may optionally include a management computing device as a manager node 1406. In addition, the system 1400 may include one or more video sources 1408 and one or more video consumers 1410 able to communicate with the computing devices 1300 via the one or more networks 1404. In some cases, the video source 1408 and the video consumer 1410 may be the same computing device, while in other cases they may be separate computing devices, and may be remote from each other.

In some implementations, the one or more networks 1404 may include a local area network (LAN). However, implementations herein are not limited to a LAN, and the one or more networks 1404 can include any suitable network, including a wide area network, such as the Internet; an intranet; a wireless network, such as a cellular network, a local wireless network, such as Wi-Fi and/or close-range wireless communications, such as BLUETOOTH®; a wired network; or any other such network, a direct wired connection, or any combination thereof. Accordingly, the one or more networks 1404 may include both wired and/or wireless communication technologies. Components used for such communications can depend at least in part upon the type of network, the environment selected, or both. Protocols for communicating over such networks are well known and will not be discussed herein in detail. Accordingly, the computing devices 1402 are able to communicate over the one or more networks 1404 using wired or wireless connections, and combinations thereof.

As one example, the video source(s) 1408 may send a plurality of video streams 1412 to the one or more computing devices 1300 over the one or more networks 1404. In some instances, the manager node 1406 may manage the sending of the video streams 1412, may determine which computing device 1300 processes which video streams 1412, and so forth. The computing device(s) 1300 may process the video streams 1412 as described herein, and may send video play out 1414 to the one or more video consumers 1410. In some examples, the receiving of the video streams 1412 and the sending of the video play out 1414 may occur in real time or near real time, such that any delay noticeable to a video consumer is negligible. Further, in some examples, rather than retrieving the related content 144 from a local storage, the computing device 1300 may search for and retrieve the related content 144 from one or more web servers 1416, or from other network-accessible locations.

As mentioned above, in some cases, IASH log information 1418 may be exported as metadata to the video consumer(s) 1410, such as for linking to broadcast media used by a broadcaster, or other video consumer 1410. The exportation may take place in real time, e.g., as the information is added to the IASH log, or may be performed at a later time, e.g., in a batch transfer of the IASH log information 1418. For example, IASH log information 1418 related to frame-based indexes and annotations may be exported to and imported by broadcast media asset management systems of the video consumer(s) 1410. For instance, the video consumer(s) 1410 may use the information for managing the associated video media. The transfer of IASH log information 1418 can be performed via XML, web services, text file transmittal, update to a database, API sockets, or through any other suitable communication protocols or mediums.

Additionally, the computing devices 1406, 1408, 1410 and 1416 described above may have hardware configurations similar to those discussed above with respect to the computing device 1300, but with different data and functional components to enable them to perform the various functions discussed herein. Further, while several example system architectures have been discussed herein, numerous other system architectures will be apparent to those of skill in the art having the benefit of the disclosure herein.

Various instructions, processes and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
    at least one display;
    one or more processors coupled to the at least one display; and
    one or more computer-readable media storing instructions executable by the one or more processors, wherein the instructions program the one or more processors to:
        receive at least one video stream including a plurality of video frames;
        present the at least one video stream on the at least one display;
        calculate a priority associated with a plurality of features in the plurality of video frames based on a frequency of occurrence of the plurality of features in the at least one video stream;
        perform, using at least one pipeline, at least one video analysis task to analyze the plurality of features in the at least one video stream, wherein the priority is associated with the at least one video analysis task;
        manage at least one of operations or resources related to the at least one video analysis task based at least in part on the priority associated with the at least one video analysis task;
        maintain a log data structure, wherein the log data structure includes a plurality of entries corresponding to index information associated with at least some of the plurality of video frames of the at least one video stream, wherein the index information is based at least in part on results of the at least one video analysis task; and
        determine, at least in part from the log data structure, the frequency of occurrence of the plurality of features in the at least one video stream.

2. The system as recited in claim 1, wherein each feature of the plurality of features corresponds to at least one mathematical representation that represents, at least in part, visual properties of at least one of:
    a region of a video frame;
    an entire image of the video frame; or
    multiple regions of the video frame.

3. The system as recited in claim 1, wherein the instructions further program the one or more processors to calculate the priority based at least in part on at least one of:
    a visual category associated with the plurality of features; or
    content associated with the plurality of features.

4. The system as recited in claim 1, wherein the instructions further program the one or more processors to use a plurality of pipelines for performing a plurality of different respective video analysis tasks, and managing the at least one of the operations or resources further comprises:
    in response to calculating a higher priority for features associated with a first video analysis task, allocating more resources to a first pipeline for performing the first video analysis task than to a second pipeline for performing a second video analysis task associated with features having a lower priority.

5. The system as recited in claim 1, wherein the instructions further program the one or more processors to use a plurality of pipelines for performing a plurality of different respective video analysis tasks, and managing the at least one of the operations or resources further comprises:
    in response to calculating a priority for features associated with a first video analysis task that is lower than a threshold priority, at least one of stopping or temporarily skipping the first video analysis task to provide resources to a video analysis task associated with a higher priority.

6. The system as recited in claim 1, wherein the instructions further program the one or more processors to use a plurality of pipelines for performing a plurality of different respective video analysis tasks, and managing the at least one of the operations or resources further comprises:
    determining, that a first priority associated with a first video analysis task has changed to be higher than a second priority associated with a second video analysis task; and
    based at least in part on the change in the first priority, allocating resources from the second video analysis task to the first video analysis task.

7. The system as recited in claim 1, wherein the instructions further program the one or more processors to:
    search the log data structure for an indexed profile that corresponds to the plurality of features, the log data structure including a plurality of entries for a plurality of respective regions from the plurality of video frames, wherein individual ones of the entries include index information related to corresponding indexed profiles that have been matched to the respective regions.

8. The system as recited in claim 1, wherein the instructions further program the one or more processors to:
    send, to a computing device over a network, at least a portion of the log data structure as metadata indicative of content of the at least some of the plurality of video frames.

9. The system as recited in claim 1, wherein the instructions further program the one or more processors to:
    allocate computational resources with respect to at least one of a video processing task, an indexing task, an annotation task, a region detection task, a related material search task, a censorship task, or an augmentation task, wherein allocation of the computational resources is performed based at least in part on a priority associated with at least one of a visual category or a particular index profile.

10. A method comprising:
    receiving at least one video stream including a plurality of video frames;
    determining, by one or more processors, a first priority associated with a first plurality of features in the plurality of video frames, and a second priority associated with a second plurality of features in the plurality of video frames, wherein the first priority and the second priority are based, at least in part, on a frequency of occurrence of the first plurality of features and the second plurality of features in the at least one video stream;

using a first pipeline to perform a first video analysis task to analyze the first plurality of features, wherein the first priority is associated with the first video analysis task;

using a second pipeline, at least partially in parallel with the first pipeline, to perform a second video analysis task to analyze the second plurality of features, wherein the second priority is associated with the second video analysis task; and managing resources related to the first video analysis task and the second video analysis task based at least in part on the first priority and the second priority, wherein the first pipeline and the second pipeline each include a respective series of stages for performing a respective video analysis task, wherein at least one stage in each pipeline is dependent on an output of a predecessor stage in that pipeline.

11. The method as recited in claim 10, further comprising determining the first priority based at least in part on at least one of:
   a visual category associated with the first plurality of features; or
   content associated with the first plurality of features.

12. The method as recited in claim 10, wherein managing the resources further comprises:
   in response to determining the first priority is a higher priority than the second priority, allocating more resources to the first pipeline for performing the first video analysis task than to the second pipeline for performing the second video analysis task.

13. The method as recited in claim 10, wherein managing the resources further comprises:
   determining, that the first priority associated with a first video analysis task has changed to be higher than the second priority associated with a second video analysis task; and
   based at least in part on the change in the first priority, allocating resources from the second video analysis task to the first video analysis task.

14. The method as recited in claim 10, further comprising:
   maintaining a log data structure, wherein the log data structure includes a plurality of entries corresponding to index information associated with at least some of the plurality of video frames of the at least one video stream, wherein the index information is based at least in part on results of the first video analysis task and the second video analysis task; and
   determining, at least in part from the log data structure, the frequency of occurrence of the first plurality of features and the second plurality of features in the at least one video stream.

15. One or more non-transitory computer-readable media maintaining instructions that, when executed by one or more processors, program the one or more processors to:
   receive at least one video stream including a plurality of video frames;
   determine a first priority associated with a plurality of first features in the plurality of video frames based at least in part on a frequency of occurrence of the plurality of first features in the at least one video stream;
   perform a first video analysis task to analyze the plurality of first features in the at least one video stream, wherein the first priority is associated with the first video analysis task;
   perform a second video analysis task to analyze a plurality of second features in the plurality of video frames; and
   manage at least one of operations or resources related to the first video analysis task and the second video analysis task based at least in part on the first priority associated with the first video analysis task, wherein managing at least one of the operations or resources comprises:
      determining, that the first priority associated with the first video analysis task has changed to be higher than a second priority associated with the second video analysis task; and
      based at least in part on the change in the first priority, allocating resources from the second video analysis task to the first video analysis task.

16. The one or more non-transitory computer-readable media as recited in claim 15, wherein the instructions further program the one or more processors to determine the first priority based at least in part on at least one of:
   a visual category associated with the plurality of first features; or
   content associated with the plurality of first features.

17. The one or more non-transitory computer-readable media as recited in claim 15, wherein the instructions further program the one or more processors to use a plurality of pipelines for performing a plurality of different respective video analysis tasks, including the first video analysis task and the second video analysis task, and wherein managing the at least one of the operations or resources further comprises:
   in response to determining that the priority for the first features associated with the first video analysis task is higher than the second priority, allocating more resources to a first pipeline for performing the first video analysis task than to a second pipeline for performing the second video analysis task associated with the second features.

18. The one or more non-transitory computer-readable media as recited in claim 15, wherein the instructions further program the one or more processors to use a first pipeline for performing the first video analysis task, and a second pipeline for performing the second video analysis task, wherein the first pipeline and the second pipeline each include a respective series of stages for performing a respective video analysis task, wherein at least one stage in each pipeline is dependent on an output of a predecessor stage in that pipeline.

19. The one or more non-transitory computer-readable media as recited in claim 15, wherein the instructions further program the one or more processors to:
   maintain a log data structure, wherein the log data structure includes a plurality of entries corresponding to index information associated with at least some of the plurality of video frames of the at least one video stream, wherein the index information is based at least in part on results of the first video analysis task and the second video analysis task; and
   determine, at least in part from the log data structure, the frequency of occurrence of the plurality of first features in the at least one video stream.

* * * * *